(12) United States Patent
Clark et al.

(10) Patent No.: US 12,407,393 B2
(45) Date of Patent: Sep. 2, 2025

(54) SYSTEM AND METHOD FOR SPATIAL AWARENESS OVERLAY ONTO MOBILE AD HOC NETWORK (MANET) FREQUENT MESSAGE PREAMBLES

(71) Applicant: Rockwell Collins, Inc., Cedar Rapids, IA (US)

(72) Inventors: Stephen M. Clark, Evansdale, IA (US); Tj T. Kwon, Marion, IA (US); Brian L. Aanderud, Eden Prairie, MN (US); Eric J. Loren, North Liberty, IA (US); William B. Sorsby, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 434 days.

(21) Appl. No.: 17/957,881

(22) Filed: Sep. 30, 2022

(65) Prior Publication Data
US 2023/0379033 A1  Nov. 23, 2023

Related U.S. Application Data

(63) Continuation-in-part of application No. 17/857,920, filed on Jul. 5, 2022, now Pat. No. 12,287,418, which
(Continued)

(51) Int. Cl.
*H04B 7/06* (2006.01)
*H04L 5/00* (2006.01)

(52) U.S. Cl.
CPC .......... *H04B 7/068* (2013.01); *H04L 5/0048* (2013.01)

(58) Field of Classification Search
CPC ..... H04B 7/068; H04B 7/0667; H04L 5/0048; H04L 5/005; H04L 5/0051
See application file for complete search history.

(56) References Cited

U.S. PATENT DOCUMENTS

| 4,134,113 A | 1/1979 | Powell |
| 4,399,531 A | 8/1983 | Grande et al. |

(Continued)

FOREIGN PATENT DOCUMENTS

| CN | 101330448 A | 12/2008 |
| CN | 101465793 A | 6/2009 |

(Continued)

OTHER PUBLICATIONS

Seddigh M et al: "Dominating sets and neighbor elimination-based broadcasting algorithms in wireless networks", vol. 13, No. 1, Jan. 1, 2002, pp. 14-25.
(Continued)

*Primary Examiner* — Keith Ferguson
(74) *Attorney, Agent, or Firm* — Suiter Swantz IP

(57) ABSTRACT

A communications node of a mobile ad hoc network (MANET) or like multi-node network may receive a preamble and/or header portion associated with a resource allocation message (e.g., as opposed to the full message) transmitted by another network node in motion relative to the receiving node. The receiving node determines a receiver-side Doppler nulling direction (e.g., for offsetting Doppler shift associated with the motion of the transmitting node relative to the receiving node) by adjusting a receiving frequency of the preamble and/or header portion through one or more nulling frequencies, each nulling frequency associated with a nulling direction for offsetting Doppler shift due to relative motion in that direction. Based on the determination of a receiver-side Doppler nulling frequency, the receiving node can determine a velocity and direction of the relative motion between the receiving and transmitting nodes.

20 Claims, 11 Drawing Sheets

Related U.S. Application Data is a continuation-in-part of application No. PCT/US2022/024653, filed on Apr. 13, 2022, which is a continuation of application No. 17/233,107, filed on Apr. 16, 2021, now Pat. No. 11,726,162, said application No. 17/857,920 is a continuation of application No. 17/541,703, filed on Dec. 3, 2021, now Pat. No. 12,137,048, which is a continuation-in-part of application No. 17/408,156, filed on Aug. 20, 2021, now Pat. No. 11,737,121, and a continuation-in-part of application No. 17/233,107, filed on Apr. 16, 2021, now Pat. No. 11,726,162, and a continuation-in-part of application No. 17/079,175, filed on Oct. 23, 2020, now Pat. No. 11,304,084, and a continuation-in-part of application No. 17/020,231, filed on Sep. 14, 2020, now Pat. No. 11,296,966, which is a continuation-in-part of application No. 16/987,671, filed on Aug. 7, 2020, now Pat. No. 11,290,942, and a continuation-in-part of application No. 16/698,230, filed on Nov. 27, 2019, now Pat. No. 10,999,778, said application No. 17/857,920 is a continuation of application No. 17/534,061, filed on Nov. 23, 2021, now Pat. No. 11,665,658, application No. 17/957,881 is a continuation-in-part of application No. 17/846,625, filed on Jun. 22, 2022.

(60) Provisional application No. 63/344,445, filed on May 20, 2022.

(56) References Cited

U.S. PATENT DOCUMENTS

| | | |
|---|---|---|
| 4,806,934 A | 2/1989 | Magoon |
| 5,835,482 A | 11/1998 | Allen |
| 5,898,902 A | 4/1999 | Tuzov |
| 6,072,425 A | 6/2000 | Vopat |
| 6,115,394 A | 9/2000 | Balachandran et al. |
| 6,148,219 A | 11/2000 | Engelbrecht et al. |
| 6,195,403 B1 | 2/2001 | Anderson et al. |
| 6,496,940 B1 | 12/2002 | Horst et al. |
| 6,611,773 B2 | 8/2003 | Przydatek et al. |
| 6,662,229 B2 | 12/2003 | Passman et al. |
| 6,721,290 B1 | 4/2004 | Kondylis et al. |
| 6,744,740 B2 | 6/2004 | Chen |
| 6,845,091 B2 | 1/2005 | Ogier et al. |
| 7,023,818 B1 | 4/2006 | Elliott |
| 7,171,476 B2 | 1/2007 | Maeda et al. |
| 7,242,671 B2 | 7/2007 | Li et al. |
| 7,299,013 B2 | 11/2007 | Rotta et al. |
| 7,417,948 B2 | 8/2008 | Sjöblom |
| 7,558,575 B2 | 7/2009 | Losh et al. |
| 7,573,835 B2 | 8/2009 | Sahinoglu et al. |
| 7,633,921 B2 | 12/2009 | Thubert et al. |
| 7,679,551 B2 | 3/2010 | Petovello et al. |
| 7,698,463 B2 | 4/2010 | Ogier et al. |
| 7,719,989 B2 | 5/2010 | Yau |
| 7,729,240 B1 | 6/2010 | Crane et al. |
| 7,787,450 B1 | 8/2010 | Chan et al. |
| 7,881,229 B2 | 2/2011 | Weinstein et al. |
| 7,903,662 B2 | 3/2011 | Cohn |
| 7,983,239 B1 | 7/2011 | Weinstein et al. |
| 8,036,224 B2 | 10/2011 | Axelsson et al. |
| 8,121,741 B2 | 2/2012 | Taft et al. |
| 8,138,626 B2 | 3/2012 | Jonsson et al. |
| 8,159,954 B2 | 4/2012 | Larsson et al. |
| 8,218,550 B2 | 7/2012 | Axelsson et al. |
| 8,223,660 B2 | 7/2012 | Allan et al. |
| 8,223,868 B2 | 7/2012 | Lee |
| 8,341,289 B2 | 12/2012 | Hellhake et al. |
| 8,396,686 B2 | 3/2013 | Song et al. |
| 8,490,175 B2 | 7/2013 | Barton et al. |
| 8,553,560 B2 | 10/2013 | Axelsson et al. |
| 8,630,291 B2 | 1/2014 | Shaffer et al. |
| 8,638,008 B2 | 1/2014 | Baldwin et al. |
| 8,717,230 B1 | 5/2014 | Fischi et al. |
| 8,717,935 B2 | 5/2014 | Lindem, III et al. |
| 8,732,338 B2 | 5/2014 | Hutchison et al. |
| 8,798,034 B2 | 8/2014 | Aggarwal et al. |
| 8,824,444 B1 | 9/2014 | Berenberg et al. |
| 8,849,596 B2 | 9/2014 | Ting et al. |
| 8,867,427 B2 | 10/2014 | Taori et al. |
| 8,913,543 B2 | 12/2014 | Zainaldin |
| 8,942,197 B2 | 1/2015 | Rudnick et al. |
| 8,964,739 B1 | 2/2015 | Wisehart |
| 8,989,326 B2 | 3/2015 | An et al. |
| 9,179,475 B2 | 11/2015 | Koleszar et al. |
| 9,213,387 B2 | 12/2015 | King et al. |
| 9,246,795 B2 | 1/2016 | Madaiah et al. |
| 9,294,159 B2 | 3/2016 | Duerksen |
| 9,304,198 B1 | 4/2016 | Doerry et al. |
| 9,325,513 B2 | 4/2016 | Liu et al. |
| 9,345,029 B2 | 5/2016 | Monte et al. |
| 9,435,884 B2 | 9/2016 | Inoue |
| 9,516,513 B2 | 12/2016 | Saegrov et al. |
| 9,544,162 B2 | 1/2017 | Vasseur et al. |
| 9,628,285 B2 | 4/2017 | Császár |
| 9,713,061 B2 | 7/2017 | Ruiz et al. |
| 9,719,803 B2 | 8/2017 | Ratcliff et al. |
| 9,858,822 B1 | 1/2018 | Gentry |
| 9,979,635 B2 | 5/2018 | Hellhake et al. |
| 10,067,199 B2 | 9/2018 | Eldridge et al. |
| 10,097,469 B2 | 10/2018 | Hui et al. |
| 10,098,051 B2 | 10/2018 | Mosko et al. |
| 10,205,654 B2 | 2/2019 | Choi et al. |
| 10,236,648 B2 | 3/2019 | Irons et al. |
| 10,257,655 B2 | 4/2019 | Cody |
| 10,382,897 B1 | 8/2019 | Lanes et al. |
| 10,455,521 B2 | 10/2019 | Hudson et al. |
| 10,459,074 B1 | 10/2019 | Omer et al. |
| 10,484,837 B2 | 11/2019 | Navalekar et al. |
| 10,531,500 B2 | 1/2020 | Ulinskas |
| 10,601,684 B2 | 3/2020 | Hashmi et al. |
| 10,601,713 B1 | 3/2020 | Turgeman et al. |
| 10,609,622 B2 | 3/2020 | Bader et al. |
| 10,785,672 B2 | 9/2020 | Kwan et al. |
| 10,798,053 B2 | 10/2020 | Nolan et al. |
| 10,873,429 B1 | 12/2020 | Kwon et al. |
| 10,931,570 B1 | 2/2021 | Kwon et al. |
| 10,965,584 B1 | 3/2021 | Kwon et al. |
| 10,979,348 B1 | 4/2021 | Kwon et al. |
| 10,993,201 B2 | 4/2021 | Luecke |
| 10,999,778 B1 | 5/2021 | Kwon et al. |
| 11,071,039 B2 | 7/2021 | Fallon et al. |
| 11,082,324 B2 | 8/2021 | Ramanathan et al. |
| 11,129,078 B2 | 9/2021 | Yates et al. |
| 11,258,520 B2 | 2/2022 | Goergen et al. |
| 11,284,295 B1 | 3/2022 | Kwon et al. |
| 11,290,942 B2 | 3/2022 | Kwon et al. |
| 11,500,111 B2 | 11/2022 | Frederiksen et al. |
| 11,528,675 B2 | 12/2022 | Nagaraja et al. |
| 11,977,173 B2 | 5/2024 | Loren et al. |
| 12,050,279 B2 | 7/2024 | Stevens et al. |
| 12,111,406 B2 | 10/2024 | Sorsby et al. |
| 2002/0018448 A1 | 2/2002 | Amis et al. |
| 2003/0035589 A1 | 2/2003 | Kim |
| 2003/0151513 A1 | 8/2003 | Herrmann et al. |
| 2004/0012859 A1 | 1/2004 | Minefuji |
| 2004/0028016 A1 | 2/2004 | Billhartz |
| 2004/0123228 A1 | 6/2004 | Kikuchi et al. |
| 2004/0213239 A1 | 10/2004 | Lin et al. |
| 2004/0246902 A1 | 12/2004 | Weinstein et al. |
| 2005/0025076 A1 | 2/2005 | Chaudhuri et al. |
| 2005/0033789 A1 | 2/2005 | Sirois |
| 2005/0141545 A1* | 6/2005 | Fein ............... H04W 74/0816 370/445 |
| 2006/0010170 A1 | 1/2006 | Lashley et al. |
| 2006/0056421 A1 | 3/2006 | Zaki |
| 2006/0176847 A1 | 8/2006 | Chen et al. |
| 2007/0086541 A1 | 4/2007 | Moon et al. |
| 2007/0097880 A1 | 5/2007 | Rajsic |
| 2007/0109979 A1 | 5/2007 | Fu et al. |

(56) References Cited

U.S. PATENT DOCUMENTS

| | | |
|---|---|---|
| 2007/0223497 A1 | 9/2007 | Elson et al. |
| 2007/0299950 A1 | 12/2007 | Kulkarni |
| 2008/0107034 A1 | 5/2008 | Jetcheva et al. |
| 2008/0117904 A1 | 5/2008 | Radha et al. |
| 2008/0219204 A1 | 9/2008 | Lee et al. |
| 2008/0273582 A1 | 11/2008 | Gaal et al. |
| 2008/0291945 A1 | 11/2008 | Luo |
| 2008/0310325 A1 | 12/2008 | Yang |
| 2009/0086713 A1 | 4/2009 | Luo |
| 2009/0203337 A1 | 8/2009 | Sisley et al. |
| 2009/0207694 A1 | 8/2009 | Guigne et al. |
| 2009/0233544 A1 | 9/2009 | Oyman et al. |
| 2009/0290572 A1 | 11/2009 | Gonia et al. |
| 2010/0074101 A1 | 3/2010 | Skalecki et al. |
| 2010/0074141 A1 | 3/2010 | Nguyen |
| 2010/0111065 A1 | 5/2010 | Noh et al. |
| 2010/0226450 A1 | 9/2010 | Tanaka |
| 2010/0246660 A1 | 9/2010 | Matsuo et al. |
| 2011/0006913 A1 | 1/2011 | Chen et al. |
| 2011/0013487 A1 | 1/2011 | Zhou et al. |
| 2011/0053494 A1 | 3/2011 | Kobayakawa |
| 2011/0188378 A1 | 8/2011 | Collins et al. |
| 2011/0312279 A1 | 12/2011 | Tsai et al. |
| 2012/0092208 A1 | 4/2012 | LeMire et al. |
| 2012/0098699 A1 | 4/2012 | Calmettes et al. |
| 2013/0006834 A1 | 1/2013 | Waelbroeck et al. |
| 2013/0069834 A1 | 3/2013 | Duerksen |
| 2013/0094366 A1 | 4/2013 | Lee et al. |
| 2013/0100942 A1 | 4/2013 | Rudnick et al. |
| 2013/0130682 A1 | 5/2013 | Awad et al. |
| 2013/0195017 A1 | 8/2013 | Jamadagni et al. |
| 2013/0197835 A1 | 8/2013 | Jonsson et al. |
| 2013/0250808 A1 | 9/2013 | Hui et al. |
| 2014/0017196 A1 | 1/2014 | Han et al. |
| 2014/0018097 A1 | 1/2014 | Goldstein |
| 2014/0188990 A1 | 7/2014 | Fulks |
| 2014/0229519 A1 | 8/2014 | Dietrich et al. |
| 2014/0236483 A1 | 8/2014 | Beaurepaire et al. |
| 2014/0258201 A1 | 9/2014 | Finlow-Bates |
| 2014/0340192 A1 | 11/2014 | Yamada et al. |
| 2015/0010153 A1 | 1/2015 | Robertson |
| 2015/0025818 A1 | 1/2015 | Das et al. |
| 2015/0071332 A1 | 3/2015 | Xu et al. |
| 2015/0222479 A1 | 8/2015 | Kim et al. |
| 2015/0296335 A1 | 10/2015 | Joshi et al. |
| 2015/0326689 A1 | 11/2015 | Leppänen et al. |
| 2015/0366470 A1 | 12/2015 | Kim et al. |
| 2016/0139241 A1 | 5/2016 | Holz et al. |
| 2016/0150465 A1 | 5/2016 | Jung et al. |
| 2016/0187458 A1 | 6/2016 | Shah et al. |
| 2016/0189381 A1 | 6/2016 | Rhoads |
| 2016/0265968 A1 | 9/2016 | Boutaud |
| 2016/0373997 A1 | 12/2016 | Petersen et al. |
| 2017/0111266 A1 | 4/2017 | Ko |
| 2017/0134227 A1 | 5/2017 | Song et al. |
| 2017/0149658 A1 | 5/2017 | Rimhagen et al. |
| 2017/0168163 A1 | 6/2017 | Small |
| 2017/0366223 A1 | 12/2017 | Stofer et al. |
| 2018/0013665 A1 | 1/2018 | Ko et al. |
| 2018/0026475 A1 | 1/2018 | Gelonese et al. |
| 2018/0098263 A1 | 4/2018 | Luo et al. |
| 2018/0146489 A1 | 5/2018 | Jin et al. |
| 2018/0234336 A1 | 8/2018 | Schumm et al. |
| 2018/0302807 A1 | 10/2018 | Chen et al. |
| 2018/0317226 A1 | 11/2018 | Sakoda |
| 2019/0098625 A1 | 3/2019 | Johnson et al. |
| 2019/0222302 A1 | 7/2019 | Lin et al. |
| 2019/0251848 A1 | 8/2019 | Sivanesan et al. |
| 2019/0317207 A1 | 10/2019 | Schroder et al. |
| 2019/0332067 A1 | 10/2019 | Zhao et al. |
| 2019/0349172 A1 | 11/2019 | Zhang |
| 2020/0011968 A1 | 1/2020 | Hammes et al. |
| 2020/0052997 A1 | 2/2020 | Ramanathan et al. |
| 2020/0092949 A1 | 3/2020 | Donepudi et al. |
| 2020/0196309 A1 | 6/2020 | Amouris |
| 2020/0236607 A1 | 7/2020 | Zhu et al. |
| 2020/0292706 A1 | 9/2020 | Hexsel et al. |
| 2020/0350983 A1 | 11/2020 | Alasti et al. |
| 2020/0371247 A1 | 11/2020 | Marmet |
| 2020/0396708 A1 | 12/2020 | Bharadwaj et al. |
| 2021/0083917 A1 | 3/2021 | Konishi et al. |
| 2021/0153097 A1 | 5/2021 | Du et al. |
| 2021/0201044 A1 | 7/2021 | Herdade et al. |
| 2021/0302956 A1 | 9/2021 | Sudhakaran et al. |
| 2021/0359752 A1 | 11/2021 | Wang et al. |
| 2021/0385879 A1 | 12/2021 | Mahalingam et al. |
| 2022/0030511 A1 | 1/2022 | Wang et al. |
| 2022/0038139 A1 | 2/2022 | Löwenmark et al. |
| 2022/0060959 A1 | 2/2022 | Atungsiri et al. |
| 2022/0069901 A1 | 3/2022 | Tian et al. |
| 2022/0085892 A1 | 3/2022 | Sorge |
| 2022/0086818 A1 | 3/2022 | Nam et al. |
| 2022/0094634 A1 | 3/2022 | Kwon et al. |
| 2022/0143428 A1 | 5/2022 | Goetz et al. |
| 2022/0159741 A1 | 5/2022 | Hoang et al. |
| 2022/0173799 A1 | 6/2022 | Wigard et al. |
| 2022/0198351 A1 | 6/2022 | Beaurepaire et al. |
| 2022/0295492 A1 | 9/2022 | Shattil |
| 2022/0360320 A1 | 11/2022 | Miao et al. |
| 2022/0368410 A1 | 11/2022 | Ma et al. |
| 2023/0057666 A1 | 2/2023 | Kwon et al. |
| 2023/0111316 A1 | 4/2023 | Ma et al. |
| 2023/0118153 A1 | 4/2023 | Amorim et al. |
| 2023/0133633 A1 | 5/2023 | Park et al. |
| 2023/0135149 A1 | 5/2023 | Krishnamurthy et al. |
| 2023/0280435 A1 | 9/2023 | Schatz et al. |
| 2023/0280436 A1 | 9/2023 | Loren et al. |
| 2023/0280437 A1 | 9/2023 | Kwon et al. |
| 2023/0288518 A1 | 9/2023 | Graf et al. |
| 2023/0288519 A1 | 9/2023 | Schatz et al. |
| 2023/0288521 A1 | 9/2023 | Kwon et al. |
| 2023/0296716 A1 | 9/2023 | Dean et al. |
| 2023/0379007 A1 | 11/2023 | Kwon et al. |
| 2023/0379008 A1 | 11/2023 | Sorsby et al. |
| 2023/0393229 A1 | 12/2023 | Loren et al. |
| 2024/0151800 A1 | 5/2024 | Stevens et al. |

FOREIGN PATENT DOCUMENTS

| | | |
|---|---|---|
| CN | 101330448 B | 12/2010 |
| CN | 101465793 B | 2/2011 |
| CN | 101686179 B | 1/2013 |
| CN | 103067286 B | 6/2016 |
| CN | 107645417 A | 1/2018 |
| CN | 110234147 A | 9/2019 |
| CN | 115085799 A | 9/2022 |
| DE | 102010010935 A1 | 9/2011 |
| EP | 1912392 A2 | 4/2008 |
| EP | 2208084 A4 | 11/2011 |
| EP | 2743726 A1 | 6/2014 |
| EP | 2466964 B1 | 12/2017 |
| EP | 3026961 B1 | 8/2020 |
| GB | 2542491 A | 3/2017 |
| GB | 2568122 B | 11/2019 |
| JP | 4290684 B2 | 7/2009 |
| JP | 5164157 B2 | 3/2013 |
| KR | 1020040107702 A | 12/2004 |
| KR | 100568976 B1 | 4/2006 |
| KR | 1020060078814 A | 7/2006 |
| KR | 101231707 B1 | 2/2013 |
| KR | 1020160071964 A | 6/2016 |
| WO | 9802762 A2 | 1/1998 |
| WO | 2008157609 A3 | 3/2009 |
| WO | 2012062091 A1 | 5/2012 |
| WO | 2012165938 A1 | 12/2012 |
| WO | 2015114077 A1 | 8/2015 |
| WO | 2015143604 A1 | 10/2015 |
| WO | 2017101575 A1 | 6/2017 |
| WO | 2018077864 A1 | 5/2018 |
| WO | 2019045767 A1 | 3/2019 |
| WO | 2020117427 A1 | 6/2020 |
| WO | 2020165627 A1 | 8/2020 |
| WO | 2020220233 A1 | 11/2020 |
| WO | 2021251902 A1 | 12/2021 |

(56) References Cited

FOREIGN PATENT DOCUMENTS

| WO | 2022003386 A1 | 1/2022 |
|---|---|---|
| WO | 2022202858 A1 | 9/2022 |
| WO | 2022221429 A1 | 10/2022 |
| WO | 2022232336 A1 | 11/2022 |
| WO | 2022233042 A1 | 11/2022 |
| WO | 2022233314 A1 | 11/2022 |
| WO | 2023001520 A1 | 1/2023 |
| WO | 2023030622 A1 | 3/2023 |
| WO | 2023047336 A1 | 3/2023 |
| WO | 2023057655 A1 | 4/2023 |
| WO | 2023067552 A1 | 4/2023 |
| WO | 2023068990 A1 | 4/2023 |
| WO | 2023081918 A1 | 5/2023 |

OTHER PUBLICATIONS

Turgut D. et al: "Optimizing clustering algorithm in mobile ad hoc networks using simulated annealing", vol. 3, Mar. 16, 20023, pp. 1492-1497.

Extended European Search Report dated Apr. 4, 2024; European Application No. 21190368.7.

Peng Wang, et al., "Convergence of Satellite and Terrestrial Networks: A Comprehensive Survey networks" IEEEAcess; vol. 4, Dec. 31, 2019.

Pulak K. Chowdhury, et al. "Handover Schemes in Satellite Networks: State-of-the-Art and Future Research Directions" 4th Quarter 2006, vol. 8, No. 4, Oct. 1, 2006.

U.S. Appl. No. 17/408,156, filed Aug. 20, 2021, Tj T. Kwon.
U.S. Appl. No. 17/534,061, filed Nov. 23, 2021, William B. Sorsby.
U.S. Appl. No. 17/857,920, filed Jul. 5, 2022, Eric J. Loren.
U.S. Appl. No. 63/344,445, filed May 20, 2022, Eric J. Loren.
U.S. Appl. No. 16/369,398, filed Mar. 29, 2019, Kwon.
U.S. Appl. No. 17/233,107, filed Apr. 16, 2022, Loren et al.
U.S. Appl. No. 17/541,703, filed Dec. 3, 2021, Kwon et al.
U.S. Appl. No. 17/857,920, filed Jul. 5, 2022, Loren et al.
U.S. Appl. No. 17/233,107, filed Apr. 16, 2021.
PCT Patent Application No. PCT/US22/24653, filed Apr. 13, 2022.
U.S. Appl. No. 17/408,156, filed Aug. 20, 2021.
U.S. Appl. No. 17/534,061, filed Nov. 28, 2021.
U.S. Appl. No. 17/541,703, filed Dec. 3, 2021.
U.S. Appl. No. 17/846,625, filed Jun. 22, 2022.
U.S. Appl. No. 17/857,920, filed Jul. 5, 2022.
U.S. Appl. No. 63/344,445, filed May 20, 2022.
U.S. Appl. No. 17/233,107, filed Apr. 16, 2021, Eric J. Loren.
U.S. Appl. No. 16/987,671, filed Aug. 7, 2021, Kwon et al.
Extended Search Report for European Application No. 21188737.7 dated Dec. 10, 2021, 8 pages.
Extended Search Report in European Application No. 21190368.7 dated Jan. 5, 2022, 10 pages.
Kwon et al., "Efficient Flooding with Passive Clustering (PC) in Ad Hoc Networks", Computer Communication Review. 32. 44-56. 10.1145/510726.510730, Aug. 11, 2003, 13 pages.
Martorella, M. et al., Ground Moving Target Imaging via SDAP-ISAR Processing: Review and New Trends. Sensors 2021, 21, 2391. https://doi.org/10.3390/s21072391.
Seddigh et al., "Dominating sets and neighbor elimination-based broadcasting algorithms in wireless networks", IEE Transactions in Parallel and Distributed Systems, IEEE, USA, vol. 13, No. 1, Jan. 1, 2002 (Jan. 1, 2002), pp. 14-25, XP011094090, ISSN: 1045-9219, DOI 10.1109/71.9800214.
Yi et al., "Passive Clustering in Ad Hoc Networks (PC)", URL: https://tools.ietf,org/html/drafts-yi-manet-pc-00, Nov. 14, 2001, 31 pages.

* cited by examiner

SYSTEM AND METHOD FOR SPATIAL AWARENESS OVERLAY ONTO MOBILE AD HOC NETWORK (MANET) FREQUENT MESSAGE PREAMBLES

CROSS-REFERENCE TO RELATED APPLICATIONS

The present application is related to and claims priority from the following U.S. Patent Applications:
(a) U.S. patent application Ser. No. 17/233,107, filed Apr. 16, 2021;
(b) PCT Patent Application No. PCT/US22/24653, filed Apr. 13, 2022;
(c) U.S. patent application Ser. No. 17/408,156, filed Aug. 20, 2021;
(d) U.S. patent application Ser. No. 17/534,061, filed Nov. 28, 2021;
(e) U.S. patent application Ser. No. 17/541,703, filed Dec. 3, 2021;
(f) U.S. patent application Ser. No. 17/846,625, filed Jun. 22, 2022;
(g) U.S. patent application Ser. No. 17/857,920, filed Jul. 5, 2022; and
(h) U.S. Provisional Patent Application No. 63/344,445, filed May 20, 2022.

Said U.S. and PCT patent applications Ser. Nos. 17/233,107; PCT/US22/24653; 17/408,156; 17/534,061; 17/541,703; 17/846,625; 17/857,920; and 63/344,445 are herein incorporated by reference in their entirety.

BACKGROUND

Mobile Ad-hoc NETworks (MANET; e.g., "mesh networks") are known in the art as quickly deployable, self-configuring wireless networks with no pre-defined network topology. Each communications node within a MANET is presumed to be able to move freely. Additionally, each communications node within a MANET may be required to forward (relay) data packet traffic. Data packet routing and delivery within a MANET may depend on a number of factors including, but not limited to, the number of communications nodes within the network, communications node proximity and mobility, power requirements, network bandwidth, user traffic requirements, timing requirements, and the like.

In the context of MANETs and other multi-node communication networks, topology learning is the key task of routing mechanisms especially for proactive routing. Topology learning is non-trivial and requires significant over-the-air control packet exchanges due to the frequent topology changes caused by node mobility and channel condition changes. It is very hard to construct accurate topology of a large MANET. Existing routing protocols utilize small hello packet exchanges to identify neighbor nodes. Hello messaging with neighbor list is a commonly used mechanism to learn the $1^{st}$ and the $2^{nd}$ hop neighbors. Local topology learned by hello messaging is delivered via packet flooding or hop-by-hop propagation throughout the connected network. By combining local topology information, each and every communication node may identify efficient routes to all connected communication nodes. Whether by hello messaging or packet flooding, however, topology learning and neighbor discovery are major sources of MANET overhead.

In addition to topology factors, fast-moving platforms (e.g., communications nodes moving relative to each other) experience a frequency Doppler shift (e.g., offset) due to the relative radial velocity between each set of nodes. If the Doppler frequency shift is large enough, the communication receiver must implement algorithms that estimate and correct for this doppler shift before performing demodulation. If the receiver does not perform the necessary compensation, the system will operate with a reduced receiver sensitivity and loss of performance—when experiencing large relative velocity between nodes.

SUMMARY

In a first aspect, a receiving (Rx) node of a mobile ad hoc communications network (MANET) or like multi-node network is disclosed. In embodiments, the Rx node receives a preamble and/or header portion (e.g., a full header or partial portion thereof) of a resource allocation message sent by a transmitting (Tx) node of the network, where the Tx node is in motion according to a particular velocity vector (e.g., having a velocity and a direction) relative to a common reference frame known to both nodes (e.g., known to all nodes of the network), and the motion of the Tx node relative to the Rx node is associated with a Doppler frequency shift. The Rx node determines a receiver-side Doppler nulling direction (e.g., to offset the Doppler shift) by adjusting a receiving frequency of the resource allocation message through a set of nulling frequencies each corresponding to a Doppler nulling direction (e.g., where each nulling frequency offsets a relative Doppler shift in the given nulling direction). Based on the frequency adjustment, the Rx node determines a relative velocity and/or relative direction of the Tx node (relative to the Rx node).

In some embodiments, the network is a cell-based network, the Rx node is a participating member of a cell of the network, and the Tx node is an administrator of the cell.

In some embodiments, the Tx node is a tactical base station (TBS) of the network.

In some embodiments, the Rx node is a one-hop neighbor of the Tx node. For example, the Rx node may create a replica message based on the received preamble and/or header portion, e.g., if the resource allocation message is overly noisy or improperly demodulated. The replica message may be correlated against the original resource allocation message, and the replica message used by the Rx node as a basis for adjusting the receiving frequency through the set of nulling frequencies.

In some embodiments, the Rx node is a participating member of a cell, and the Tx node is an administrator or TBS of a different cell of the network.

In some embodiments, the Rx node is in transition from the current cell to the cell administered by the Tx node.

In some embodiments, the common reference frame, as well as the relative motion between the Tx and Rx nodes, is three-dimensional.

In some embodiments, the Rx node determines the receiver-side nulling direction by adjusting the receiving frequency through a set of step frequencies. For example, each step frequency may correspond to an incremental arc section (e.g., 10, 15, 20 degrees).

In some embodiments, the Rx node is also in motion according to a receiver-side velocity vector (e.g., having a velocity and a direction). For example, based on receiver-side adjustments to the receiving frequency (e.g., and transmitter-side adjustments to the transmitting frequency by the Tx node), the Rx node determines a relative velocity vector (velocity, direction), e.g., the difference in velocity vectors between the Tx and Rx nodes.

In some embodiments, the Tx node is associated with a transmitter-side Doppler nulling direction, and the Rx node determines the receiver-side Doppler nulling direction by adjusting the receiving frequency to a nulling frequency corresponding to a nulling direction opposite the transmitter-side Doppler nulling direction.

In some embodiments, the Rx node is time synchronized with the Tx node.

In some embodiments, the resource allocation message (or preamble or header portion thereof) is associated with a time of transmission (TOT) by the Tx node, the TOT known to the Rx node. For example, the Rx node determines a time of arrival (TOA) of the resource allocation message/preamble/header portion at the Rx node, and can determine, based on the TOT and TOA, a distance between the Tx and Rx nodes.

In a further aspect, a transmitting (Tx) node of a MANET or like multi-node network is also disclosed. In embodiments, the Tx node is in motion according to a velocity vector (having a velocity and a direction) relative to a common reference frame known to each node of the network. For example, the Tx node is an administrator or otherwise associated with a cell (e.g., of a cell-based network) and transmits (e.g., at predetermined intervals) to participating nodes of the cell resource allocation messages having a preamble and a header. The Tx node determines a transmitter-side Doppler nulling direction (e.g., to offset Doppler frequency shift associated with the relative motion of the Tx node) by adjusting a transmitting frequency of the preamble or header (or of the resource allocation message) through a nulling frequency corresponding to a particular Doppler nulling direction (e.g., for offsetting Doppler shift due to relative motion in that direction).

In some embodiments, the Tx node determines the transmitter-side Doppler nulling frequency by adjusting the transmitting frequency through a set of step frequencies, where each step frequency is associated with an incremental arc section (e.g., 10, 15, 20 degrees).

In some embodiments, the Tx node is a tactical base station (TBS) configured for administration of the network cell.

In a still further aspect, a method is disclosed. In embodiments, the method includes receiving, via a receiving (Rx) node of a MANET or like multi-node network, a preamble and/or header portion of a resource allocation message sent by a Tx node of the network, the Tx node in motion according to a velocity vector having a velocity and a direction. The method includes determining, via the Rx node, a receiver-side nulling direction (e.g., for offsetting a Doppler frequency shift associated with the motion of the Tx node relative to the Rx node) by adjusting a receiving frequency of the message, preamble, and/or header portion through a nulling frequency corresponding to a Doppler nulling direction (e.g., for offsetting Doppler shift due to relative motion in said direction). The method includes, based on the adjustment of the receiving frequency/determination of the Rx-side nulling frequency, determining a relative velocity vector of the Tx node relative to the Rx node (e.g., a relative velocity, a relative direction).

In some embodiments, the method includes creating, via the Rx node, a replica message (e.g., a replica header portion and/or replica data payload) based on a noisy or incorrectly demodulated resource allocation message, and performing receiver-side frequency adjustment based on a correlation of the replica message and the resource allocation message.

In some embodiments, the method includes adjusting, via the Rx node, the receiving frequency through a set of step frequencies, each step frequency corresponding to an incremental arc section or Doppler nulling direction.

In some embodiments, the Tx and Rx nodes are time synchronized, and the preamble, header portion, and/or message is associated with a time of transmission (TOT) by the Tx node that is also known to the Rx node, and the method includes determining, via the Rx node, a time of arrival (TOA) of the preamble, header portion, and/or message at the Rx node. The method includes determining, based on the TOT and TOA, an estimate of the distance between the Tx and Rx nodes.

In some embodiments, the network is a cell-based network wherein the Rx node is a participating member of a cell within the network, and the Tx node is a tactical base station (TBS) configured for cell administration (e.g., either of the cell of which the Rx node is a participating member, or another cell).

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
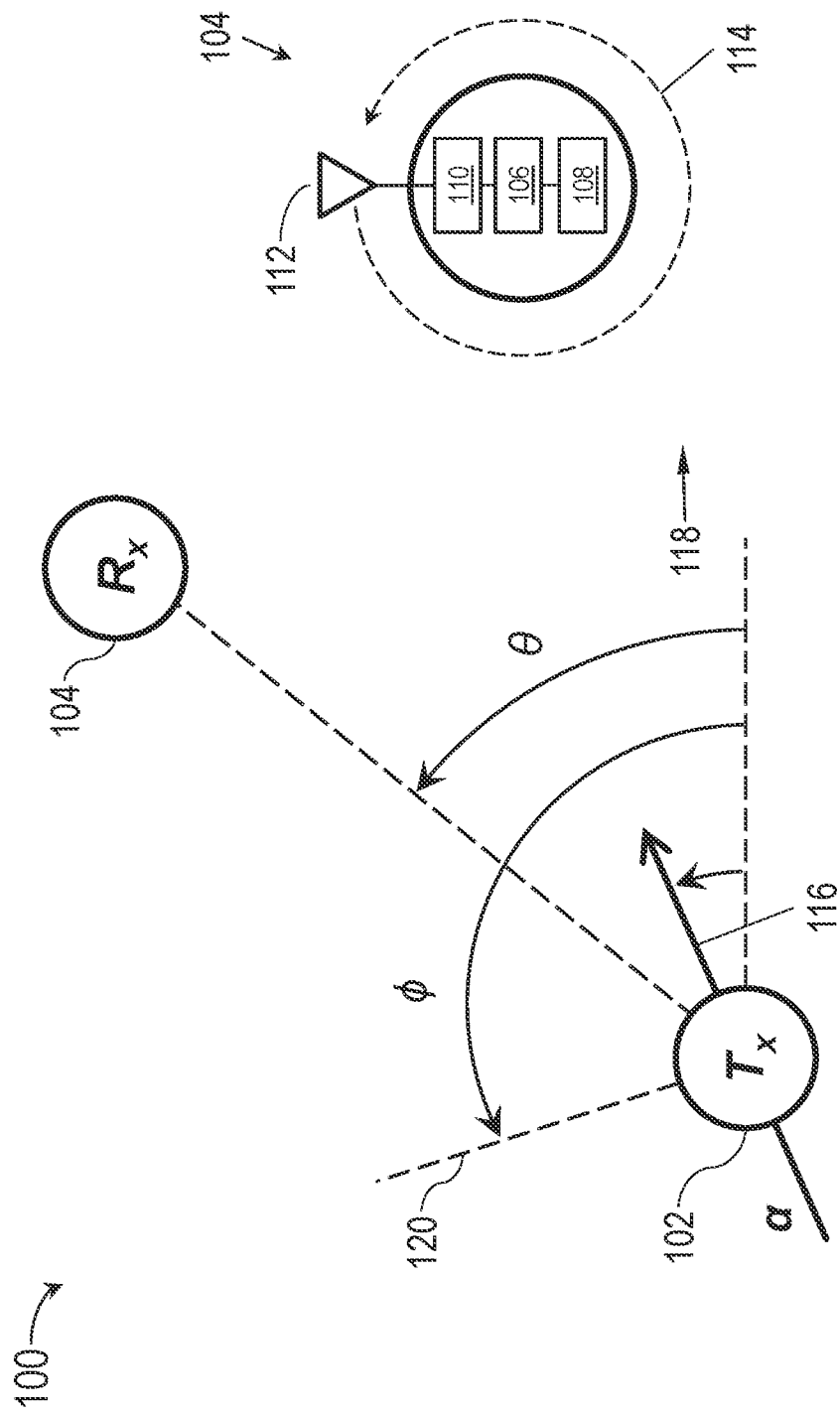
FIG. 1 is a diagrammatic illustration of a transmitting (Tx) and receiving (Rx) node of multi-node communications network, and the components of each node, according to example embodiments of the inventive concepts disclosed herein.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a multi-node communications network 100 is disclosed. The multi-node communications network 100 may include multiple communications nodes, e.g., a transmitting (Tx) node 102 and a receiving (Rx) node 104.

In embodiments, the multi-node communications network 100 may include any multi-node communications network known in the art. For example, the multi-node communications network 100 may include a mobile ad-hoc network (MANET) in which the Tx and Rx nodes 102, 104 (as well as every other communications node within the multi-node communications network) is able to move freely and independently. Similarly, the Tx and Rx nodes 102, 104 may include any communications node known in the art which may be communicatively coupled. In this regard, the Tx and Rx nodes 102, 104 may include any communications node known in the art for transmitting/transceiving data packets. For example, the Tx and Rx nodes 102, 104 may include, but are not limited to, radios, mobile phones, smart phones, tablets, smart watches, laptops, and the like. In embodiments, the Rx node 104 of the multi-node communications network 100 may each include, but are not limited to, a respective controller 106 (e.g., control processor), memory 108, communication interface 110, and antenna elements 112. (In embodiments, all attributes, capabilities, etc. of the Rx node 104 described below may similarly apply to the Tx node 102, and to any other communication node of the multi-node communication network 100.)

In embodiments, the controller 106 provides processing functionality for at least the Rx node 104 and can include any number of processors, micro-controllers, circuitry, field programmable gate array (FPGA) or other processing systems, and resident or external memory for storing data, executable code, and other information accessed or generated by the Rx node 104. For example, the controller 106 may execute one or more software programs embodied in a non-transitory computer readable medium (e.g., memory 108) that implement techniques described herein. The controller 106 is not limited by the materials from which it is formed or the processing mechanisms employed therein and, as such, can be implemented via semiconductor(s) and/or transistors (e.g., using electronic integrated circuit (IC) components), and so forth.

In embodiments, the memory 108 can be an example of tangible, computer-readable storage medium that provides storage functionality to store various data and/or program code associated with operation of the Rx node 104 and/or controller 106, such as software programs and/or code segments, or other data to instruct the controller 106, and possibly other components of the Rx node 104, to perform the functionality described herein. For example, the memory 108 can store data, such as a program of instructions for operating the Rx node 104, including its components (e.g., controller 106, communication interface 110, antenna elements 112, etc.), and so forth. It should be noted that while a single memory 108 is described, a wide variety of types and combinations of memory (e.g., tangible, non-transitory memory) can be employed. The memory 108 can be integral with the controller 106, can comprise stand-alone memory, or can be a combination of both. Some examples of the memory 108 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

In embodiments, the communication interface 110 can be operatively configured to communicate with components of the Rx node 104. For example, the communication interface 110 can be configured to retrieve data from the controller 106 or other devices (e.g., the Tx node 102 and/or other nodes), transmit data for storage in the memory 108, retrieve data from storage in the memory, and so forth. The communication interface 110 can also be communicatively coupled with the controller 106 to facilitate data transfer between components of the Rx node 104 and the controller 106. It should be noted that while the communication interface 110 is described as a component of the Rx node 104, one or more components of the communication interface 110 can be implemented as external components communicatively coupled to the Rx node 104 via a wired and/or wireless connection. The Rx node 104 can also include and/or connect to one or more input/output (I/O) devices. In embodiments, the communication interface 110 includes or is coupled to a transmitter, receiver, transceiver, physical connection interface, or any combination thereof.

It is contemplated herein that the communication interface 110 of the Rx node 104 may be configured to communicatively couple to additional communication interfaces 110 of additional communications nodes (e.g., the Tx node 102) of the multi-node communications network 100 using any wireless communication techniques known in the art including, but not limited to, GSM, GPRS, CDMA, EV-DO, EDGE, WiMAX, 3G, 4G, 4G LTE, 5G, WiFi protocols, RF, LoRa, and the like.

In embodiments, the antenna elements 112 may include directional or omnidirectional antenna elements capable of being steered or otherwise directed (e.g., via the communications interface 110) for spatial scanning in a full 360-degree arc (114) relative to the Rx node 104.

In embodiments, one or both of the Tx node 102 and Rx node 104 may be moving in an arbitrary direction at an arbitrary speed, and similarly may be moving relative to each other. For example, the Tx node 102 may be moving relative to the Rx node 104 according to a velocity vector 116, at a relative velocity $\vec{V_T}$ and a relative angular direction (an angle $\alpha$ relative to an arbitrary direction 118 (e.g., due east); $\theta$ may be the angular direction of the Rx node relative to due east.

In embodiments, any signal transmitted by the Tx node 102 and received by the Rx node 104 may be associated with a Doppler frequency shift proportional to the relative radial velocity between the Tx and Rx nodes. For example, the relative radial velocity may be defined by the motion of the Tx node 102 or of the Tx and Rx nodes 104 (e.g., if both are in motion), in two or three dimensions.

In embodiments, the Tx node 102 may correct for its own Doppler frequency shift (e.g., due to its own motion according to the velocity vector 116) by implementing a Doppler nulling protocol, e.g., in an earth-centered earth-fixed (ECEF) reference frame (or in some other reference frame as needed). For example, the Tx node 102 may adjust its transmit frequency to counter the Doppler frequency offset such that there is no net frequency offset (e.g., "Doppler null") for a given Doppler nulling direction 120 (at an angle $\phi$ relative to the arbitrary direction 118, e.g., 100 degrees from due east). In embodiments, the communications interface 110 of the Tx node 102 may be informed by the platform (e.g., the controller 106) of its own velocity vector and orientation (e.g., a, $(\vec{V_T})$) and may adjust its transmitting frequency to remove the Doppler frequency shift at each Doppler nulling direction 120 and angle $\phi$. For example, when the Rx node 104 is stationary, the Doppler shift as seen by the Rx node due to the motion of the Tx node 102 may be $$\frac{\Delta f_{DOPPLER}}{f} = \frac{|\vec{V_T}|}{c}\cos(\theta - \alpha).$$

In embodiments, the Tx node 102 may adjust its transmitting frequency ($\Delta f_T$) to correct for this Doppler shift, based on its speed $|\vec{V_T}|$ and velocity direction $\alpha$, such that the transmitter frequency adjustment $\Delta f_T$ is proportional to the velocity projection onto the Doppler null direction and is $$\frac{\Delta f_T}{f} = \frac{|\vec{V_T}|}{c}\cos(\varphi - \alpha)$$

such that the net frequency shift $\Delta f_{net}$ seen by the Rx node 104 is the sum of these two terms, thus $$\frac{\Delta f_{net}}{f} = \frac{|\vec{V_T}|}{c}[\cos(\theta - \alpha) - \cos(\varphi - \alpha)].$$

It is assumed that the velocity vector $|\vec{V_T}|$ and velocity direction $\alpha$ will change slowly relative to periodic measurements of $\Delta f_{net}$, such that from the perspective of the Rx node 104 $\alpha$, $|\vec{V_T}|$, and $\theta$ may be regarded as constants.

In embodiments, when the Doppler nulling direction 120 aligns with the receiver direction $\theta$ (e.g., the direction of the Rx node 104 relative to the Tx node 102), the transmitter frequency adjustment $\Delta f_T$ may compensate exactly for the net Doppler shift $\Delta f_{net}$. It may further be assumed that the Rx node 104 is configured to resolve any adjustments to the frequency of the inbound transmitted signal.

In embodiments, by plotting (200) the net frequency shift as a function of the Doppler nulling direction when the Rx node 104 is stationary and due east of the Tx node 102 ($\theta=0$), and assuming a consistent Tx node velocity and direction (e.g., 1500 m/s, $\alpha=0$ (e.g., due east)) the sinusoidal plot may maintain an amplitude consistent with Tx speed $$\left(\frac{|\vec{V_T}|}{c}1e^6,\right.$$

or 5 ppm) regardless of velocity direction or position. Further, net frequency shift is zero when the Doppler nulling angle 120 is aligned with the relative direction of the Rx node 104 (e.g., $\Phi=0$). Further still, the minimum net frequency shift (e.g., greatest negative frequency shift) occurs when the Doppler nulling direction 120 is aligned with the velocity direction of the Tx node 102 (e.g., $\Phi=\alpha$).

Figure 2A:
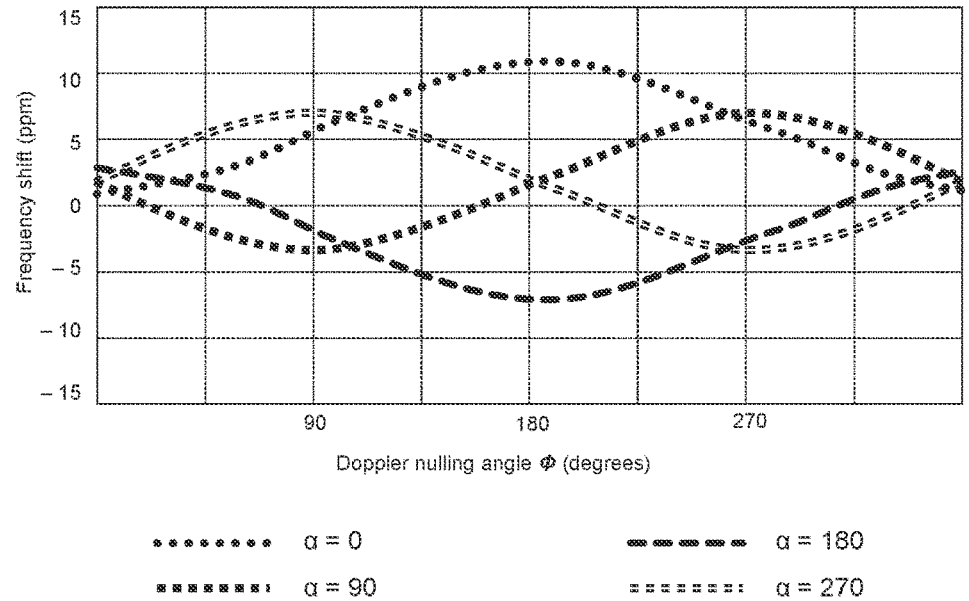
FIGS. 2A and 2B are plots of net Doppler frequency shift as a function of Doppler nulling angle for a mobile Tx node and stationary Rx nodes of the network of FIG. 1 at various angles.
Figure 2B:
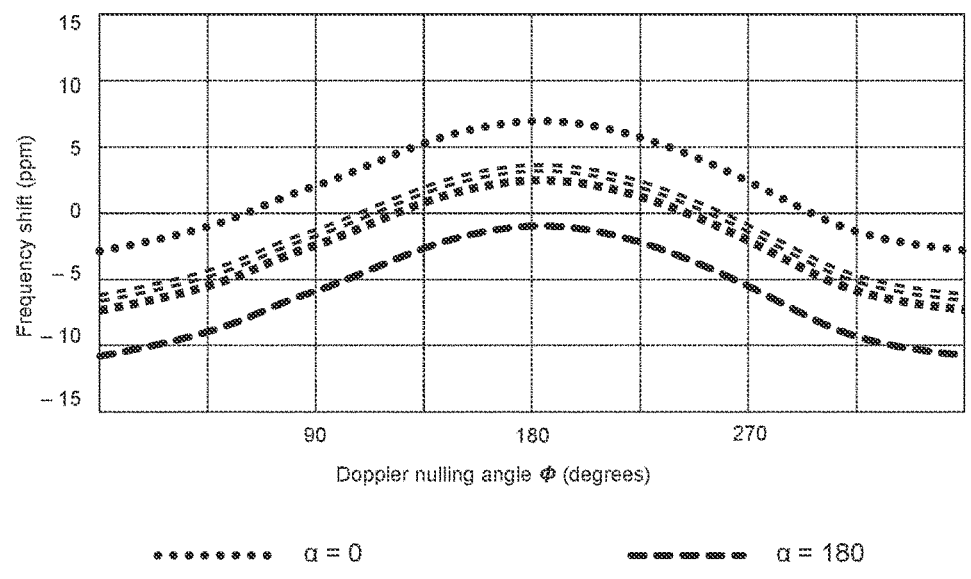

In embodiments, based on the above the stationary Rx node 104 may determine a speed of the Tx node 102 (e.g., $|\vec{V_T}|$), a heading of the Tx node (e.g., $\alpha$), and a direction of the Tx node relative to the Rx node (e.g., $\theta$). For example, although ambiguities of position direction may exist (e.g., 0 vs. 180 degrees as shown by FIG. 2A; ±90 degrees as shown by FIG. 2B), it is assumed the Rx node 104 is configured to resolve any such ambiguities, e.g., the Rx node knows whether the Tx node 102 is west or east of it.

Figure 3:
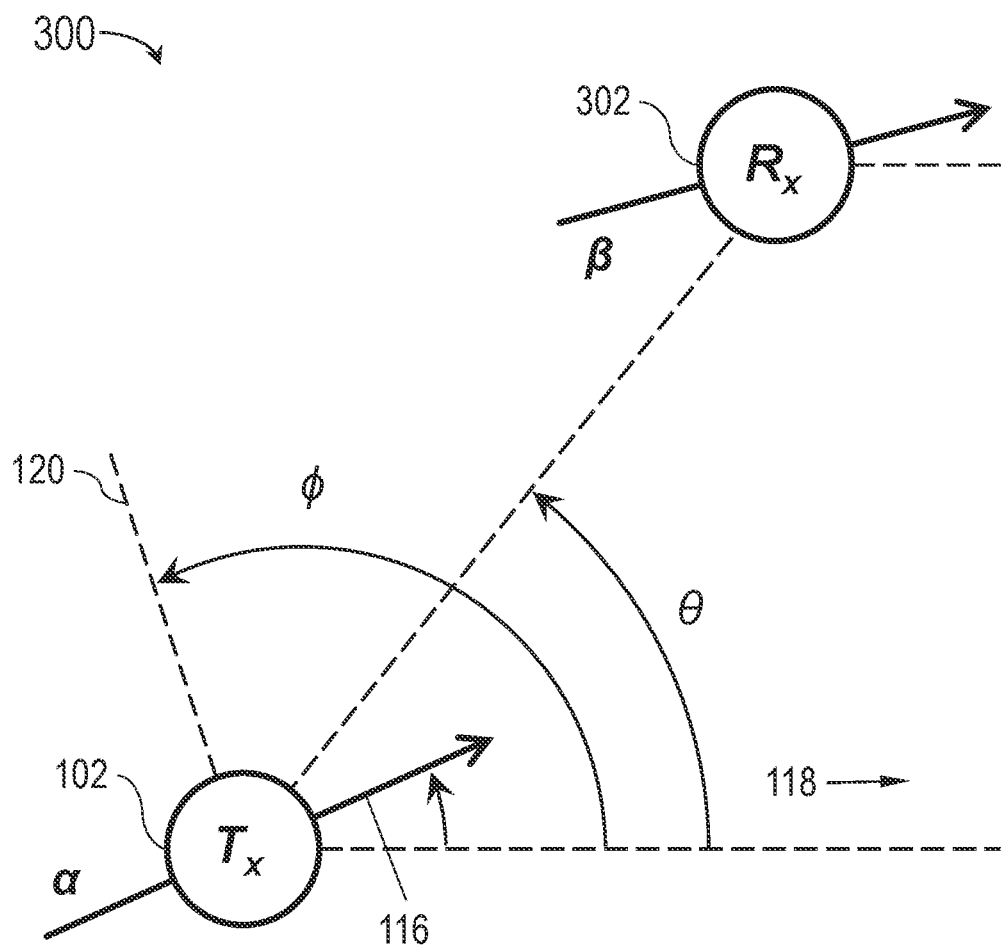
FIG. 3 is a diagrammatic illustration of the multi-node communications network of FIG. 1 wherein both the Tx and Rx nodes are mobile.

Referring now to FIG. 3, the multi-node communications network 300 may be implemented and may function similarly to the multi-node communications network 100 of FIG. 1, except that the Rx node 302 of the multi-node communications network 300 may also be in motion (e.g., characterized by a receiver velocity $|\vec{V_T}|$ and a velocity direction $\beta$. In embodiments, the Rx node 302 may adjust its receiver frequency to compensate for its motion as well as the motion of the Tx node 102. For example, the true Doppler shift as seen by the Rx node 302 (due to the relative radial velocity between the Tx node 102 and the Rx node) may be $$\frac{\Delta f_{DOPPLER}}{f} = \frac{|\vec{V_T}|}{c}\cos(\theta - \alpha) - \frac{|\vec{V_R}|}{c}\cos(\theta - \beta).$$

In embodiments, both the Tx node 102 and the Rx node 302 may adjust their respective transmitting and receiving frequencies ($\Delta f_T$, $\Delta f_R$), each according to their own speed ($|\vec{V_T}|$, $|\vec{V_R}|$) and velocity direction ($\alpha$, $\beta$). For example, the Rx node 302 may adjust its receiving frequency either within, or prior to, the frequency resolution algorithm resolving the adjusted transmitting frequency (e.g., $\Delta f_T$) of the received signal, thus $$\frac{\Delta f_{T\&R}}{f} = \frac{|\vec{V_T}|}{c}\cos(\varphi - \alpha) + \frac{|\vec{V_R}|}{c}\cos(\varphi - \beta).$$

Accordingly, the net frequency shift seen by the Rx node 302 may be the sum of all terms:

$$\frac{\Delta f_{net}}{f} = \frac{|\vec{V_T}|}{c}[\cos(\theta - \alpha) - \cos(\varphi - \alpha)] - \frac{|\vec{V_R}|}{c}[\cos(\theta - \beta) - \cos(\varphi - \beta)].$$

Figure 4A:
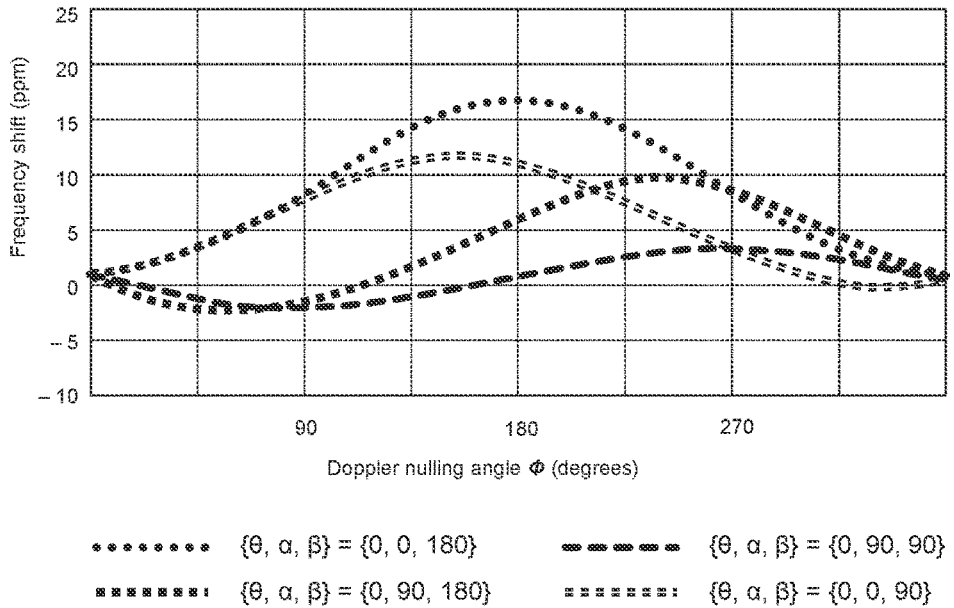
FIGS. 4A and 4B are plots of net Doppler frequency shift as a function of Doppler nulling angle for a mobile Tx and Rx nodes of the network of FIG. 3 at various angles, headings, and/or velocities.
Figure 4B:
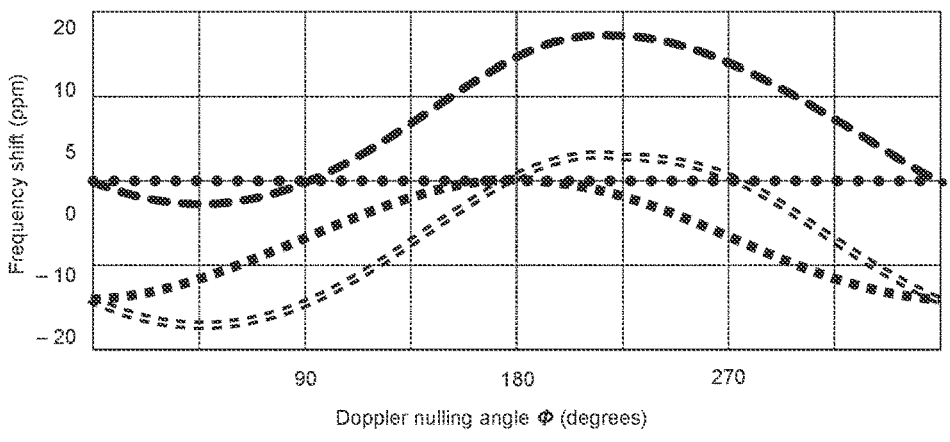

Referring also to FIGS. 4A and 4B, the net frequency shift $$\frac{\Delta f_{net}}{f}$$

for moving Tx and Rx nodes 102, 302 is plotted (400) for various relative receiver angles $\theta$ or velocity directions $\alpha$, $\beta$. FIG. 4A assumes a receiver angle $\theta=0$, while FIG. 4B assumes common transmitter and receiver velocities ($|\vec{V_T}| = |\vec{V_R}|$, e.g., 1500 m/s).

Based on FIGS. 4A and 4B, it may be observed that amplitude of net frequency shift $$\frac{\Delta f_{net}}{f}$$

(e.g., in ppm) is consistent with relative velocity between the Tx node 102 and Rx node 304:

$$\frac{|(|\vec{V_T}|\cos\alpha - |\vec{V_R}|\cos\beta)|}{c} * 1e^6.$$

Further, as noted above with respect to FIGS. 2A and 2B, the net frequency shift is zero when the Doppler null angle 120 aligns with the receiver direction, e.g., Φ=0. Further still, the minimum net frequency shift occurs when the Doppler null angle 120 aligns with the relative velocity direction:

$$\Phi = (|\vec{V_T}|\cos\alpha - |\vec{V_R}|\cos\beta).$$

As noted above with respect to FIGS. 2A and 2B, the velocity and velocity direction of the Tx node 102 may be known to the Rx node 302, resolving any dual point ambiguities with respect to the receiver angle $\theta$.

Figure 5:
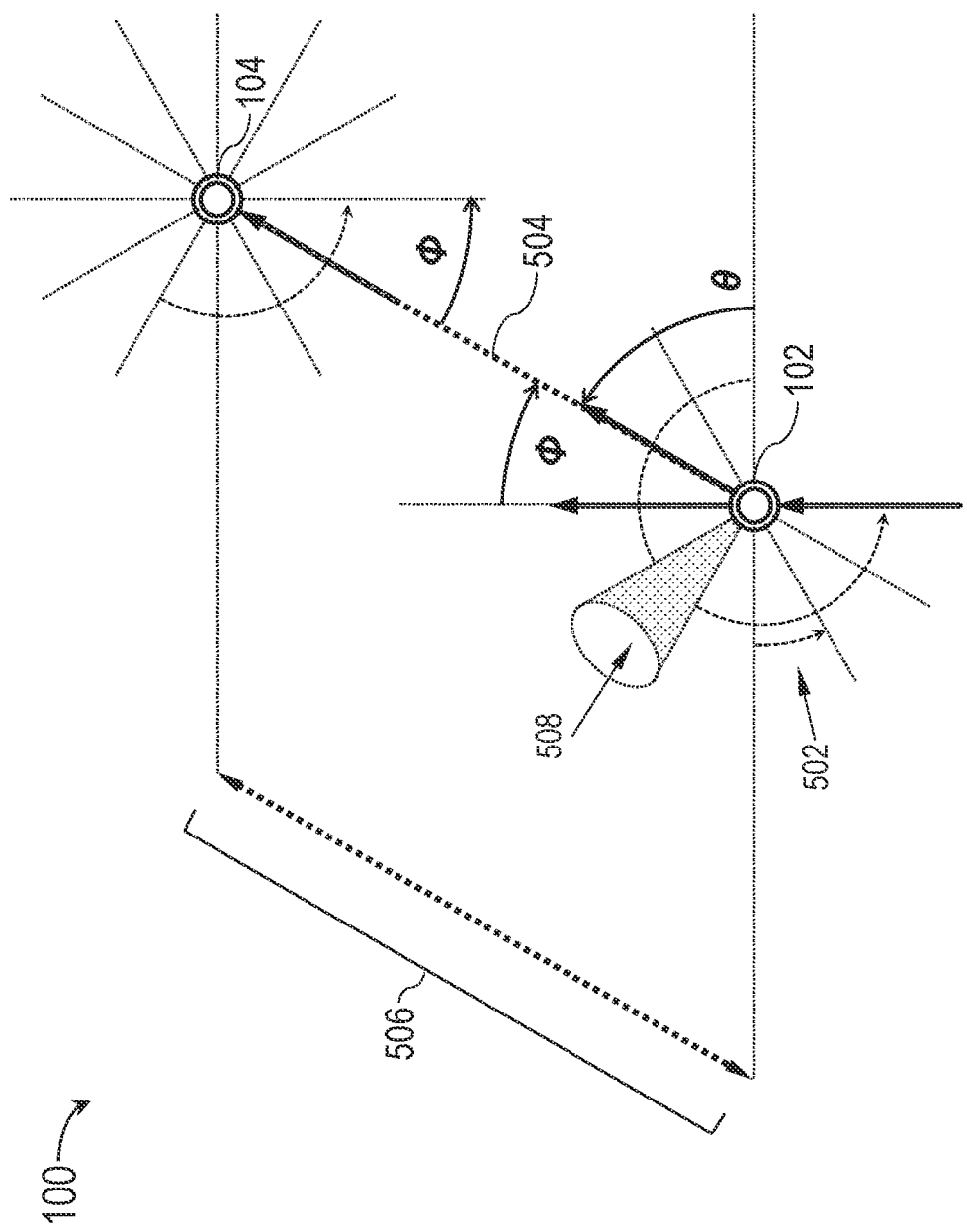
FIG. 5 is a diagrammatic illustration of Doppler null scanning operations of the Tx and Rx nodes of the multi-node communications network of FIGS. 1 and 3.

Referring now to FIG. 5, the multi-node communications network 100 is shown.

In embodiments, the Tx node 102 may scan (500) through a full 360 degrees of two-dimensional (2D) space in successive steps or intervals 502 (e.g., 36 cycles of 10 degrees each, 24 cycles of 15°, 18 cycles of 20°) to determine a shift or adjustment to the transmitter frequency (e.g., a step frequency) capable of correcting the net Doppler shift for each interval direction. In some embodiments, less intuitive or more obfuscated scan approaches may be utilized.

In embodiments, both the Tx node 102 and Rx node 104 (as well as the mobile Rx node 302, FIG. 3) may implement directional discovery of each other (as well as other nodes of the multi-node communications network 100) by scanning the full 360 degrees (or a subset thereof). For example, the Tx node 102 and Rx node 104 may be time-synchronized to apply Doppler correction respectively for their own motions relative to a common inertial reference frame. As a transmit angle advances, a receive angle retreats by a same amount as the transmit angle advance. This can be understood by first considering the Tx node 102 when the Tx node applies full Doppler correction in its own direction of travel. Next, consider the Rx node 104 directly in line with the path of travel of the Tx node 102. If the Rx node 104 at the same time similarly applies Doppler correction for the Rx node's 104 motion in line with the Tx node 102, then at least a near-zero Doppler path (e.g., a near-zero Doppler path or a zero Doppler path) will exist from the Tx node 102 to the Rx node 104.

When both the receiver node 104 and the transmitter node apply such synchronized Doppler correction relative to the common inertial reference frame, then the Doppler correction can be swept through a plurality of (e.g., some or all) angles so that a zero Doppler path 504 or near-zero Doppler path will exist from the Tx node 102 to the Rx node 104 including the angle resulting in the near-zero Doppler path or the zero Doppler path, the zero Doppler path having zero net frequency offset. For example, an angle resulting in a near-zero Doppler path may be within 5 degrees of the angle resulting in the zero Doppler path. For any combination of positions and motions of the Tx node 102 and the Rx node 104, there exists a zero-Doppler path when the Doppler nulling angle 120 is equal to a direction angle φ. Accordingly, a zero-Doppler path 504 will be available between the Tx node 102 and the Rx node 104 when the two are synchronized to apply Doppler correction for a swept angle φ relative to the inertial reference frame of choice. In embodiments, neither the Tx node 102 nor the Rx node 104 need know a direction to the other node in advance.

In embodiments, when the Doppler nulling direction 120 determined by the Tx node 102 with respect to a given transmitted signal aligns with the Doppler nulling direction 120a determined by the Rx node 104, e.g., the two Doppler nulling directions 120, 120a are offset by 180 degrees, the Rx node may determine an angle of arrival (AOA) of the transmitted signal, and thus the relative direction/receiver angle $\theta$ may be known to the Rx node (e.g., and shared with the Tx node). Further, the Tx node 102 and Rx node 104 may share a time of transmission (TOT) and a time of arrival (TOA; e.g., a time the signal is received by the Rx node) of the transmitted signal, and thereby determine a distance 506 between the Tx and Rx nodes based on the transmission delay. In embodiments, distance estimates between the Tx and Rx nodes 102, 104 may include an error component proportional to relative bias error between the two nodes. For example, if the Tx and Rx nodes 102, 104 are not perfectly synchronized, any clock error between the two nodes may produce an error component in the distance estimate (e.g., 1 light-microsecond (300 m≈984 ft) for every 1 μs/1000 ns of clock error).

In some embodiments, the 2D scanning approach may be expanded into 3D space. For example, the 2D scan for a given step direction may correspond to a conical coverage area 508, e.g., a 10-degree, 15-degree, 20-degree cone, and thereby to a 3D fractional coverage area. Accordingly Doppler null scanning for a full spherical region may be achieved by adding additional scanning cycles corresponding to the areas uncovered by the 2D scan.

Figure 6:
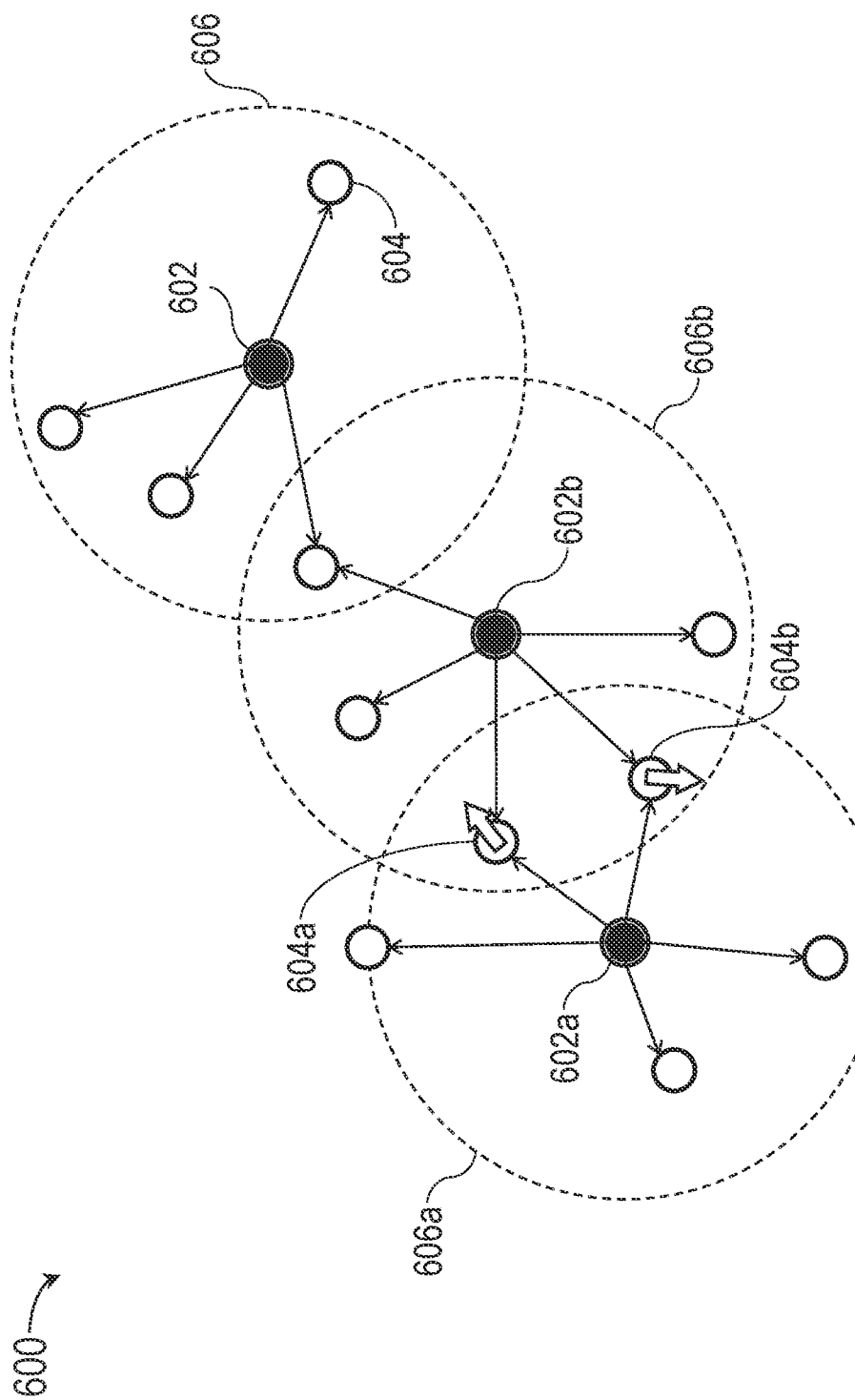
FIG. 6 is a diagrammatic illustration of a cell-based multi-node communications network according to example embodiments of the inventive concepts disclosed herein.

Referring now to FIG. 6, the mobile ad hoc network 600 (MANET) may be implemented similarly to the multi-node communications networks 100, 300 of FIGS. 1 and 3, except that the MANET 600 may be organized as a cell-based network of tactical base station (TBS) nodes 602 and user equipment (UE) nodes 604 organized into cells 606, or subsets of the MANET 600.

In embodiments, each TBS node 602 and UE node 604 may be implemented and may function similarly to the Tx and/or Rx nodes 102, 104, 302 of FIGS. 1 and 3, except that each cell 606 within the MANET 600 may correspond to a subset of the MANET administered by a TBS node 602. For example, each cell 606 may correspond to a geographical region or a coverage area of the TBS node 602.

In embodiments, the MANET 600 may correspond to an operating theater, within which each cell 606 may include a set of participating UE nodes 604 in operation within that cell. For example, within each cell 606 a TBS node 602 may control all network communications and allocate communications resources to all participating UE nodes 604

For example, participating UE nodes 604 may include ground-based, water-based, or airborne vehicles and individual manpacks operating either within, or remotely from, a vehicle. Similarly, each TBS node 602 may be a ground-based, water-based, or airborne node (e.g., an unmanned aircraft system (UAS)) in control of all network communications within the cell 606 and configured to allocate communications resources to all participating UE nodes 604 currently assigned to that TBS node. For example, resource allocations may be transmitted by each TBS node 602 to its assigned participating UE nodes 604 at regular intervals, e.g., each second.

In embodiments, each TBS node 602 and participating UE node 604 may be stationary or mobile. For example, the participating UE node 604a assigned to the TBS node 602a and the cell 606a may be in motion toward the cell 606b administered by the TBS node 602b. In embodiments, the participating UE node 604a may be handed off by the TBS node 602a to the control of the TBS node 602b, e.g., while operating within the cell 606b. For example, the participating UE node 604a may maintain communications with both TBS nodes 602a-b while preparing for the transition to the cell 606b and TBS node 602b. Similarly, the participating UE node 604b, in motion away from the cell 606b, may operate within the coverage areas of both TBS nodes 602a-b but may remain under the administration of the TBS node 602a and within the cell 606a.

Figure 7A:
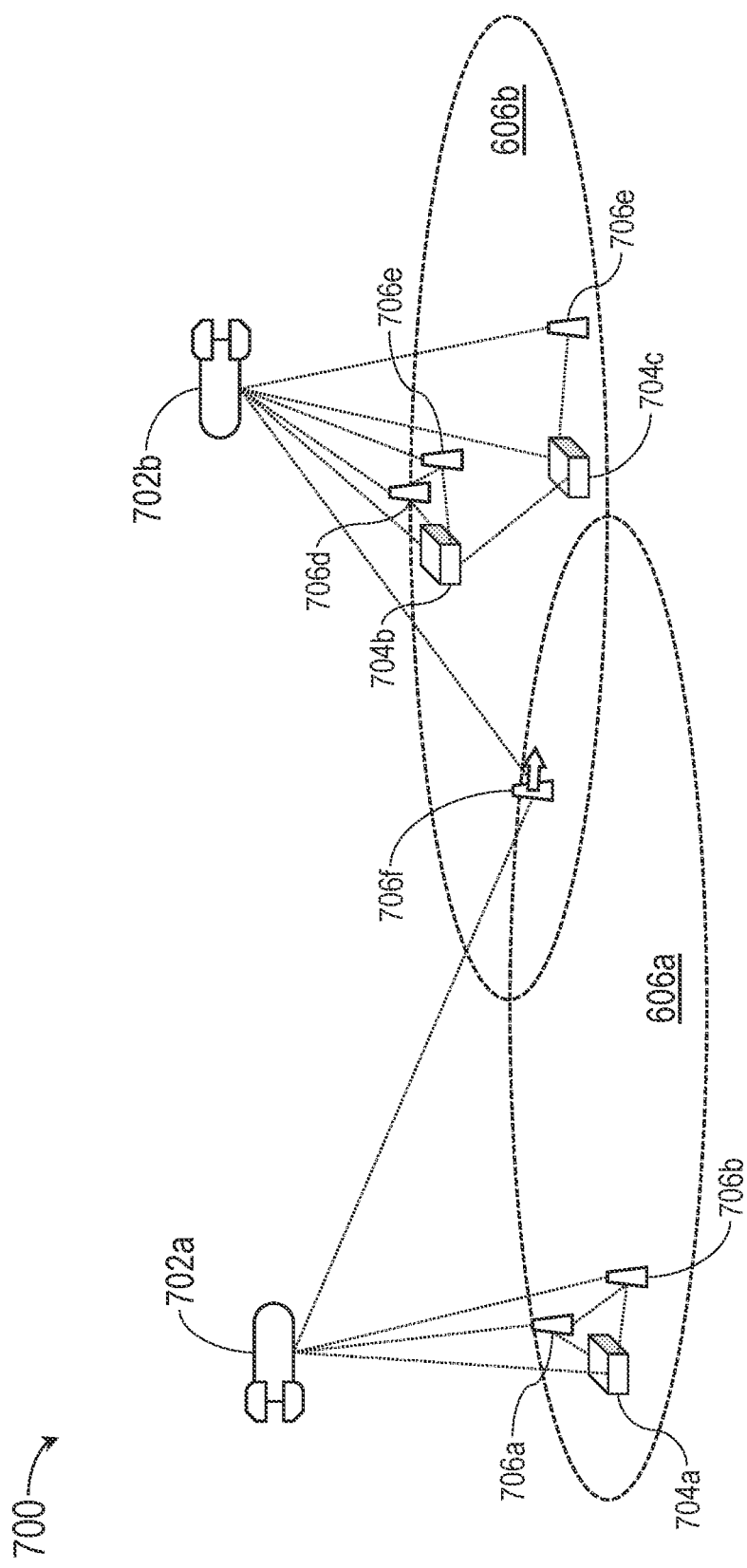
FIGS. 7A and 7B are diagrammatic illustrations of an operating theater implementation of the multi-node communications network of FIG. 6.

Referring to FIG. 7A, the multi-node communications network 700 may be implemented and may function similarly to the multi-node communications networks 100, 300, 600 except that the multi-node communications network 700 may be implemented in an operating theater.

In embodiments, the multi-node communications network 700 may include cells 606a, 606b respectively administered by airborne TBS nodes 702a, 702b. For example, the cells 606a, 606b may include participating UE nodes embodied in ground-based vehicles 704a-704c and roaming users 706a-706f (e.g., manpacks). The roaming users 706a, 706b may maintain communications links with the ground-based vehicle 704a in addition to the airborne TBS 702a, the roaming users 706c, 706d may maintain communications links with the ground-based vehicle 704b, and the roaming user 706e may maintain communications links with the ground-based vehicle 704c (in the latter two cases, in addition to the airborne TBS 702b).

In embodiments, the roaming user 704f may be a participating UE node of the cell 606a assigned to the airborne TBS 702a, but in motion toward the cell 606b administered by the airborne TBS 702b and thereby in communication with both airborne TBS nodes.

Figure 7B:
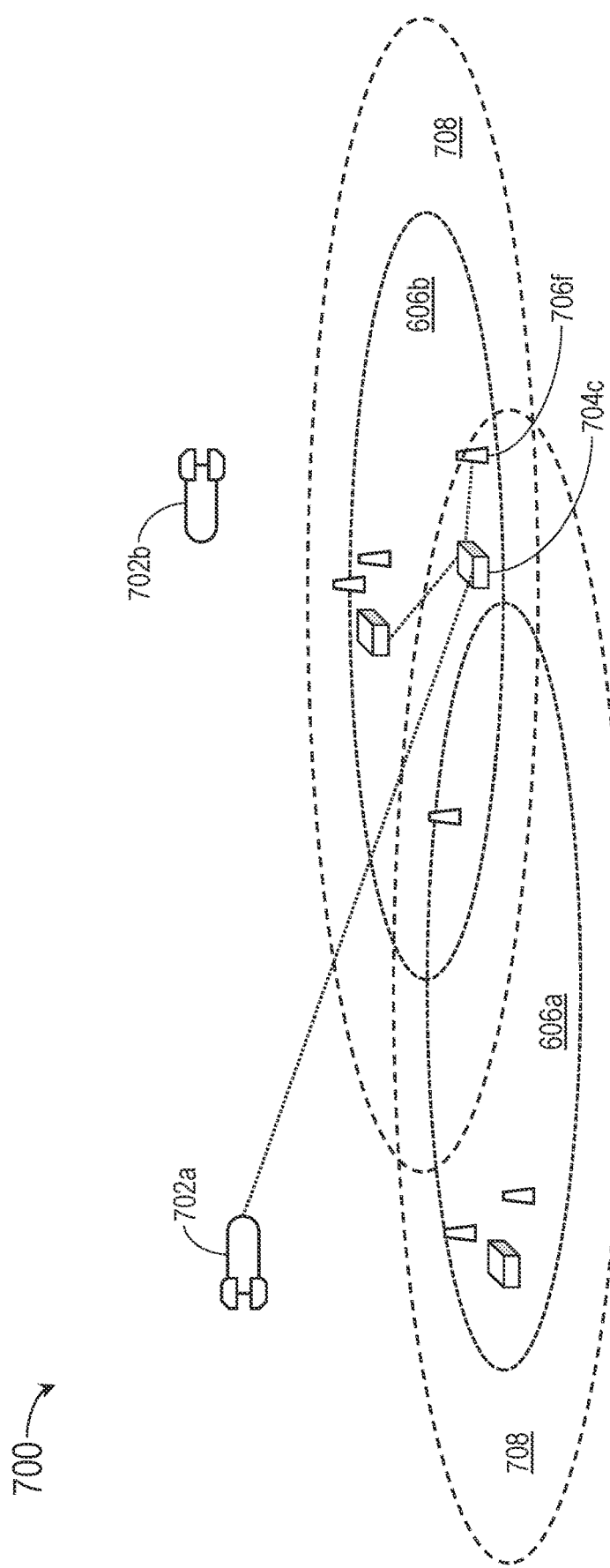

Referring also to FIG. 7B, in embodiments the airborne TBS 702a, 702b may be capable of long-haul communications links 708 beyond the normal operating range defining the cells 606a, 606b. For example, each airborne TBS 702a, 702b may receive regular resource allocation messages from the other airborne TBS. Further, the ground-based vehicle 704c and roaming user 706f may be within the long-haul range 708 of the airborne TBS 702a and may receive regular resource allocation messages therefrom.

Figure 8A:
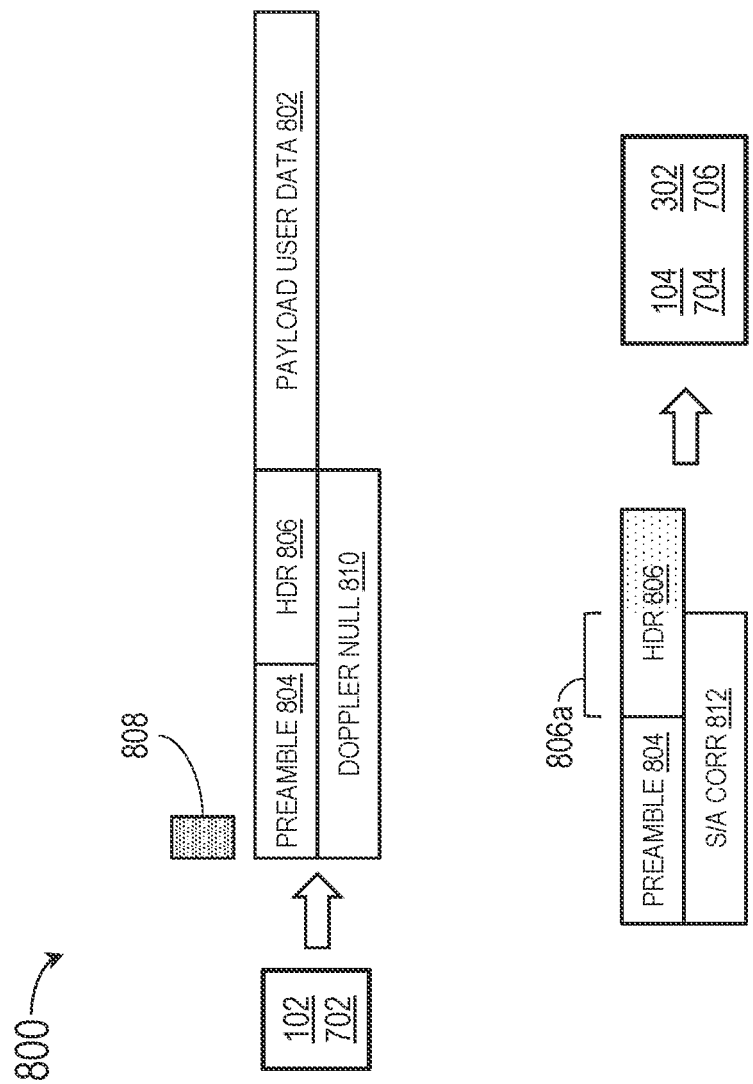
FIGS. 8A and 8B are diagrammatic illustrations of Doppler null overlay operations of the multi-node communications networks of FIGS. 1, 3, and 6 according to example embodiments of the inventive concepts disclosed herein.

Referring now to FIG. 8A, a resource allocation message 800 sent by the TBS 602a-602b of FIG. 6 and the airborne TBS 702a-702b of FIG. 7 is shown.

In embodiments, the resource allocation message 800 may include, in addition to a data payload 802, an acquisition preamble 804 and packet header 806.

Signal acquisition and detection sensitivity in current modern digital communications systems are most often contingent on a digital correlation sequence. Usable length for such a correlation sequence (and consequent resulting sensitivity) may be limited by Doppler shift as the phase increases across the correlator length, resulting in net correlation accumulation amplitude characterized by the sine cardinal (sinc) function and a net correlation energy that goes like the sine cardinal squared (sinc$^2$) function, e.g., $$\operatorname{sinc}^2 x = \frac{\sin^2 x}{x^2}, x \neq 0.$$

With increasing signal frequency offsets, optimal correlator length decreases. Accordingly, the system designer should choose a correlator length suitable to the Doppler requirements. Multiple short length correlation sequences are subsequently often used to allow sensitivity improvement beyond that of a single short correlation sequence (e.g., a random number or pseudorandom number (PR) sequence 808) but such an approach exhibits degraded sensitivity compared to a single long sequence of the same total length. In the presence of large Doppler shift, even a combination of multiple short sequences may be problematic. While multiple short sequences may be better than nothing, for the same number of bits the approach does not deliver the same sensitivity attainable with coherent detection of a single long sequence without Doppler shift. In summary, currently, a short correlation sequence is relatively unaffected by Doppler shift but has the drawback of yielding low sensitivity, whereas a long correlation sequence may be capable of yielding high sensitivity but only when Doppler shift is minimal.

In embodiments, Tx nodes (102, FIG. 1) and Rx nodes (104, FIG. 1; 302, FIG. 3) may perform frequency adjustments to correct for Doppler shift (e.g., Doppler corrections;

Doppler null overlay 810) over acquisition preambles 804 and/or packet headers 806 transmitted by the Tx nodes and received by the Rx nodes. For example, referring also to FIGS. 7A and 7B above, acquisition preambles 804 and/or packet headers 806 transmitted by TBS nodes 702 (702a-702b, FIGS. 7A-B) may be capable of travel and detection by receiving UE nodes (ground-based vehicles 704, roaming users 706) throughout the long-haul range (708, FIG. 7B) of the transmitting TBS node, whereas payload user data 802 may be reliably detectible only within the cells (606a, 606b; FIG. 7B) corresponding to the normal coverage range of the transmitting TBS node. In some embodiments, acquisition preambles 804 and/or preamble headers 806 may be received and/or detected, in whole or in part, up to three hops away.

In embodiments, transmitting Tx and TBS nodes 102, 702 may perform Doppler null overlay 810 over the complete acquisition preamble 804 and packet header 806, while receiving nodes 104, 302, 704, 706 (e.g., N-hop neighbors within the long-haul range 708 of the transmitting TBS node 702) may perform spatial aware correlations 812 (e.g., adjusting the receiving frequency of the preamble and/or header to correct for Doppler shift based on the motion of the receiving node) on the acquisition preamble and that portion 806a of the packet header deducible a priori by the receiving node, e.g., based on protocols observed by the receiving node or throughout the multi-node communications network 100, 300, 600, 700 (e.g., including legacy systems). Some examples of this type of a priori header portion 806a may include node addresses and/or the encoding mode used to modulate the payload. In embodiments, the deduction of the header portion 806a may be performed by a priori knowledge of which nodes will transmit at a given time, as well as which mode the transmitting nodes will typically use based on to recent previous transmissions. For example, if the TBS node 702a shown by FIGS. 7A and 7B needs to transmit resource allocation messages that can be heard by every participating node (704a, 706a, 706b, 706f) within its cell 606a, the TBS node will have to use the most robust mode to encode its payload data to ensure that the data can be delivered to the furthest nodes (e.g., 706f). This is an opportunity for the TBS node 102, 702 (referring back to FIG. 8A) to include the header portion 806a within the correlation window 812 shown by FIG. 8A.

Figure 8B:
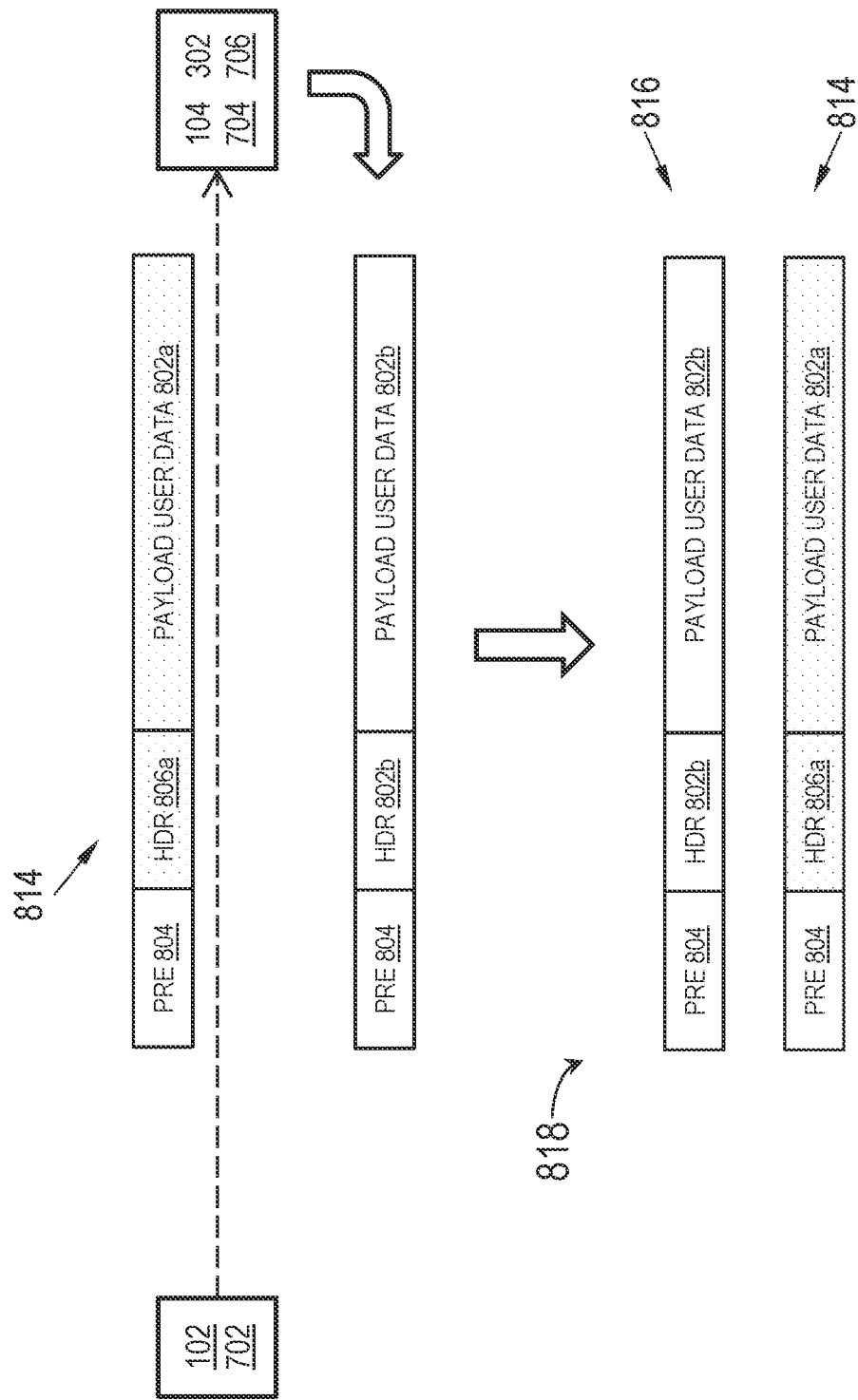

Referring also to FIG. 8B, one-hop neighbors of the transmitting Tx node 102/TBS node 702 may receive the full resource allocation message (800, FIG. 8A) but in a noisy and/or incorrectly demodulated form 814. For example, one-hop neighbors may include Rx nodes 104/302, ground-based vehicles 704, and/or roaming users 706 at the outer limits of the cell 606a-606b administered by the Tx node 102/transmitting TBS node 702. In embodiments, the resource allocation message 814 may include an intact acquisition preamble 804, but one or more of the packet header/header portion 806a and data payload 802a may be incorrectly modulated due to noise.

In embodiments, the receiving one-hop neighbor may form a replica resource allocation message 816 based on the incorrectly modulated resource allocation message 814, performing receiver-side passive spatial awareness correlation 818 over the replica resource allocation message. For example, the replica resource allocation message may include a replica packet header 806b and/or replica data payload 802b. In embodiments, the receiving one-hop neighbor may construct a replica packet header 806b, a replica data payload 802b, or other portions of a replica resource allocation message 816 via error correction coding of the incorrectly modulated data 814, e.g., via encoding of the received bits to generate redundant parity bits which may be processed by the receiving node to correct erroneously modulated bits. For example, the error-corrected portions of the incorrectly modulated resource allocation message 814 may be remodulated by the receiving node, producing "corrected" bits for remodulation into the replica packet header 806b or replica data payload 802b. In embodiments, the replica resource allocation message 816 may thus serve as a reference for the receiver-side passive spatial awareness correlation 818 against the original incorrectly modulated resource allocation message 814.

Figure 9:
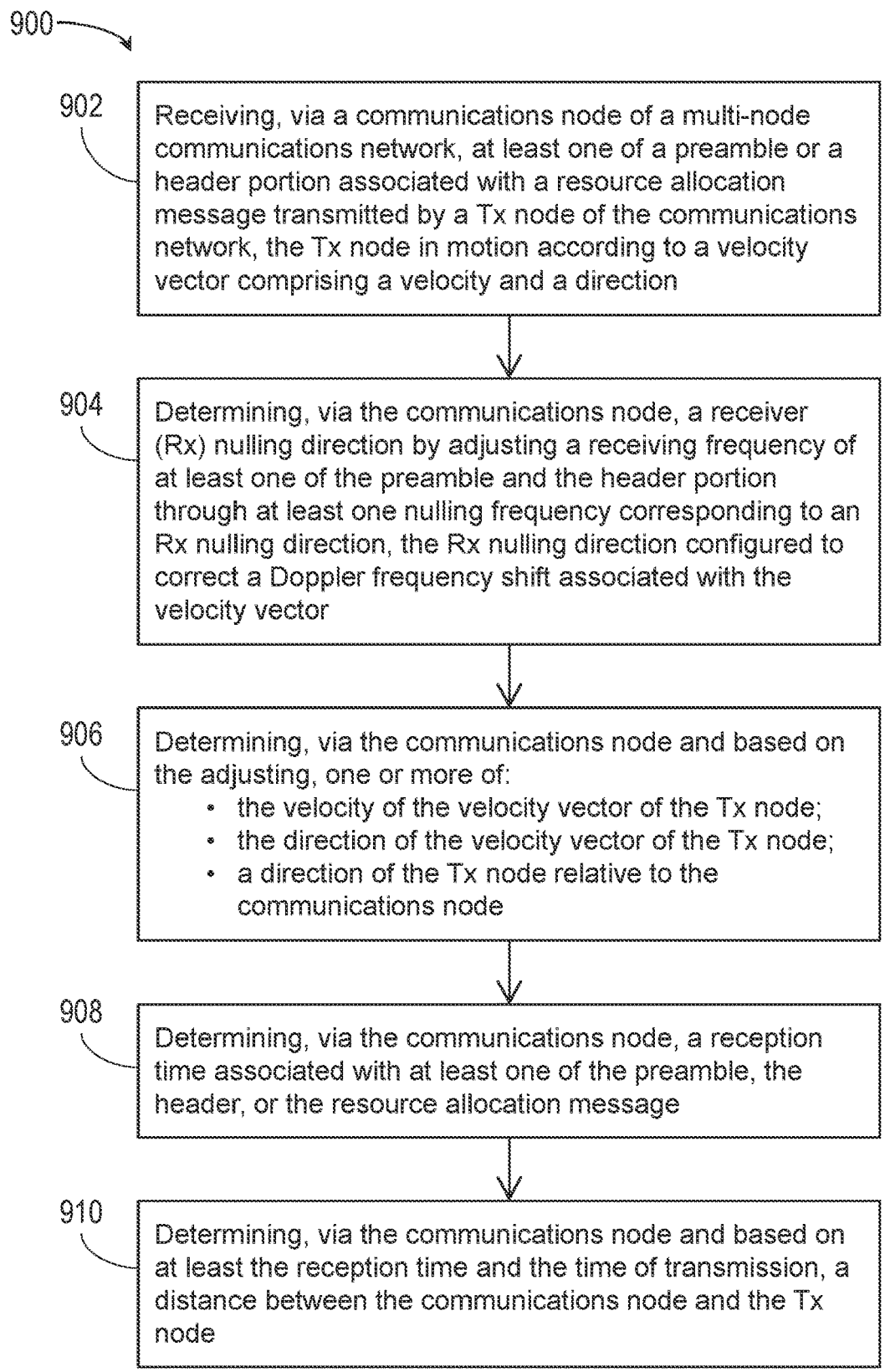
FIG. 9 is a flow diagram illustrating a method for mobile ad hoc networking operations according to example embodiments of the inventive concepts disclosed herein.

Referring now to FIG. 9, the method 900 may be implemented by the receiver nodes 104, 302, 704, 706 and may include the following steps.

At a step 902, the receiving (Rx) node receives at least a preamble or a header portion (e.g., a full header or a portion thereof) of a resource allocation message transmitted by a transmitting (Tx) node within the multi-node communications network of which the receiving node is a participating node, the Tx node in motion according to a velocity and a direction associated with a Doppler shift. In some embodiments, the network may be a cell-based network and the Tx node may be a tactical base station (TBS) configured for administration of a cell of which the receiving node is a participating member (e.g., participating user equipment (UE) such as a vehicle-based node or manpack) or for administration of another cell of the network (e.g., a cell of which the receiving node is not a participating member).

At a step 904, the receiving node determines a receiver-side Doppler nulling direction capable of correcting for Doppler shift associated with the transmitted resource allocation message and with relative motion of the transmitting Tx node and the receiver node by adjusting a receiving frequency of the resource allocation message through at least one nulling direction. For example, the receiving node may also be in motion and correcting for Doppler shift due to its own velocity and direction. In some embodiments, the receiving node may scan through a range of directions relative to a 2D or 3D inertial reference frame, performing Doppler nulling by adjusting the receiver frequency at one or more interval directions within the range.

At a step 906, the receiving node determines, based on the receiver-side Doppler nulling and transmitter-side Doppler nulling to correct for Doppler shift due to the motion of the Tx node, one or more of: the relative velocity of the Tx node; the velocity direction of the Tx node; and a direction of the Tx node relative to the receiving node, e.g., based on a determined angle of arrival (AOA) of the received transmission.

At a step 908, the receiving node may determine a time of arrival (TOA) of the preamble, header portion, and/or resource allocation message.

At a step 910, the receiving node may determine, based on the determined TOA and a time of transmission TOT of the preamble/header portion/resource allocation message by the Tx node, a distance between the receiving node and the Tx node.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A communications node of a multi-node communications network, comprising:
   a communications interface including at least one antenna element; and
   a controller operatively coupled to the communications interface, the controller including one or more processors;
      wherein a common reference frame of the communications network is known to the controller;
   and
   wherein the controller is configured to:
      receive, via the communications interface, at least one of a preamble or a header portion associated with a resource allocation message transmitted by a transmitting (Tx) node of the communications network, the Tx node in motion according to a velocity vector comprising a velocity and a direction;
      determine a receiver (Rx) nulling direction by adjusting a receiving frequency of at least one of the preamble or the header portion through at least one nulling frequency corresponding to a nulling direction, the Rx nulling direction configured to correct a Doppler frequency shift associated with the velocity vector;
      and
      determine, based on the adjusting, one or more of:
         the velocity of the velocity vector of the Tx node;
         the direction of the velocity vector of the Tx node; or
         a direction of the Tx node relative to the communications node.

2. The communications node of claim 1, wherein:
   the communications node is a participating member of a cell of the communications network;
   and
   the Tx node is an administrator of the cell.

3. The communications node of claim 2, wherein the Tx node is a tactical base station (TBS) of the communications network.

4. The communications node of claim 2, wherein:
   the communications node is a one-hop neighbor of the Tx node;
   and
   wherein the communications node is configured to:
      create a replica message corresponding to the resource allocation message based on the at least one of the preamble or the header portion;
      and
      determine the receiver (Rx) nulling direction by adjusting a receiving frequency of the replica message through the at least one nulling frequency.

5. The communications node of claim 1, wherein:
   the communications node is a participating member of a first cell of the communications network;
   and
   the Tx node is an administrator of a second cell of the communications network.

6. The communications node of claim 5, wherein:
   the communications node is configured to transition from the first cell to the second cell.

7. The communications node of claim 1, wherein the common reference frame is a three-dimensional inertial reference frame.

8. The communications node of claim 1, wherein the communications node is configured to determine the Rx nulling direction by adjusting the receiving frequency through two or more step frequencies, the two or more step frequencies corresponding to an arc section of two or more incremental angles.

9. The communications node of claim 1, wherein the velocity vector is a transmitter (Tx) velocity vector comprising a Tx velocity and a Tx direction, and:
   the communications node is in motion according to a Rx velocity vector comprising an Rx velocity and an Rx direction;
   and
   wherein the controller is configured to determine, based on the adjusting, one or more of:
      a relative velocity of the Tx node relative to the communications node;
      and
      a relative direction of the Tx node relative to the communications node.

10. The communications node of claim 9, wherein:
    the Tx node is associated with a Tx nulling direction;
    and
    wherein the controller is configured to determine the Rx nulling direction by adjusting the receiving frequency of at least one of the preamble or the header portion to an Rx nulling direction opposite the Tx nulling direction.

11. The communications node of claim 9, wherein the controller is configured to determine the Rx nulling direction based on a time synchronization with the Tx node.

12. The communications node of claim 11, wherein:
    at least one of the preamble, the header portion, or the resource allocation message is associated with a time of transmission TOT known to the controller;
    and wherein the controller is configured to:
       determine a time of arrival (TOA) associated with at least one of the preamble, the header portion, or the resource allocation message;
       and
       based on at least the TOA and the TOT determine a distance between the communications node and the Tx node.

13. A communications node of a multi-node communications network, comprising:
    a communications interface including at least one antenna element; and
    a controller operatively coupled to the communications interface, the controller including one or more processors;
       wherein a common reference frame of the communications network is known to the controller,
       wherein the communications node is in motion according to a velocity vector comprising a velocity and a direction;

and
wherein the communications node is a transmitting (Tx) node associated with a cell of one or more participating communications nodes;
wherein the controller is configured to:
transmit, via the communications interface, at least one resource allocation message to the one or more participating communications nodes, each resource allocation message including at least one of a preamble or a header portion;
and
determine a transmitter (Tx) nulling direction by adjusting a transmitting frequency of at least one of the preamble or the header through at least one nulling frequency corresponding to a nulling direction, the Tx nulling direction configured to correct a Doppler frequency shift associated with the velocity vector.

14. The communications node of claim 13, wherein the communications node is configured to determine the Tx nulling direction by adjusting the transmitting frequency through two or more step frequencies, the two or more step frequencies corresponding to an arc section of two or more incremental angles.

15. The communications node of claim 13, wherein the Tx node is a tactical base station (TBS) configured for administration of the cell.

16. A method, comprising:
receiving, via a communications node of a multi-node communications network, at least one of a preamble or a header portion associated with a resource allocation message transmitted by a transmitting (Tx) node of the communications network, the Tx node in motion according to a velocity vector comprising a velocity and a direction;
determining, via the communications node, a receiver (Rx) nulling direction by adjusting a receiving frequency of at least one of the preamble or the header portion through at least one nulling frequency corresponding to an Rx nulling direction, the Rx nulling direction configured to correct a Doppler frequency shift associated with the velocity vector;
and
determining, via the communications node and based on the adjusting, one or more of:
the velocity of the velocity vector of the Tx node;
the direction of the velocity vector of the Tx node;
or
a direction of the Tx node relative to the communications node.

17. The method of claim 16, wherein determining, via the communications node, a receiver (Rx) nulling direction by adjusting a receiving frequency of at least one of the preamble or the header portion through at least one nulling frequency includes:
creating, based on at least one of the preamble or the header portion, a replica message corresponding to the resource allocation message;
and
determining the Rx nulling direction by adjusting a receiving frequency of the replica message through the at least one nulling frequency.

18. The method of claim 16, wherein determining, via the communications node, a receiver (Rx) nulling direction by adjusting a receiving frequency of at least one of the preamble or the header portion through at least one nulling frequency includes:
adjusting the receiving frequency through two or more step frequencies, the two or more step frequencies corresponding to an arc section of two or more incremental angles.

19. The method of claim 16, wherein:
the communications node and the Tx node are time synchronized;
wherein at least one of the preamble, the header portion, or the resource allocation message is associated with a time of transmission TOT known to the communications node;
further comprising:
determining, via the communications node, a time of arrival (TOA) associated with at least one of the preamble, the header portion, or the resource allocation message;
and
determining, via the communications node and based on at least the TOA and the TOT a distance between the communications node and the Tx node.

20. The method of claim 16, wherein:
the multi-node communications network is a cell-based network comprising a plurality of cells;
the communications node is a participating member of a first cell of the plurality of cells;
and
the Tx node is a tactical base station (TBS) configured for administration of at least one cell of the plurality of cells.

* * * * *